(12) United States Patent
Peus

(10) Patent No.: US 9,512,376 B2
(45) Date of Patent: Dec. 6, 2016

(54) MATERIAL AND/OR FUEL PRODUCED FROM BIOMASS

(75) Inventor: Dominik Peus, Grasbrunn (DE)

(73) Assignee: Antacor, Ltd, Mostal (MT)

( * ) Notice: Subject to any disclaimer, the term of this patent is extended or adjusted under 35 U.S.C. 154(b) by 0 days.

(21) Appl. No.: 12/091,486

(22) PCT Filed: Dec. 28, 2007

(86) PCT No.: PCT/IB2007/055341
§ 371 (c)(1),
(2), (4) Date: Apr. 25, 2008

(87) PCT Pub. No.: WO2008/081407
PCT Pub. Date: Jul. 10, 2008

(65) Prior Publication Data
US 2010/0162619 A1    Jul. 1, 2010

(30) Foreign Application Priority Data

| Dec. 28, 2006 | (DE) | 10 2006 062 504 |
| Jun. 12, 2007 | (DE) | 10 2007 027 594 |
| Nov. 21, 2007 | (DE) | 10 2007 056 170 |
| Dec. 21, 2007 | (DE) | 10 2007 062 808 |
| Dec. 21, 2007 | (DE) | 10 2007 062 809 |
| Dec. 21, 2007 | (DE) | 10 2007 062 810 |
| Dec. 21, 2007 | (DE) | 10 2007 062 811 |

(51) Int. Cl.
*C10L 5/00* (2006.01)
*C10L 5/44* (2006.01)
*C10L 9/08* (2006.01)

(52) U.S. Cl.
CPC ............... *C10L 5/44* (2013.01); *C10L 9/083* (2013.01); *C10L 9/086* (2013.01); *Y02E 50/10* (2013.01); *Y02E 50/15* (2013.01); *Y02E 50/30* (2013.01)

(58) Field of Classification Search
CPC .......... C10L 5/44; C10L 9/083; C10L 9/086; Y02E 50/10; Y02E 50/15; Y02E 50/30
USPC ........................... 44/605, 552; 585/240, 242
See application file for complete search history.

(56) References Cited

U.S. PATENT DOCUMENTS 4,092,125 A * 5/1978 Stambaugh ............... C10J 3/00
                                                                 201/17
4,702,745 A    10/1987 Kamei et al.
(Continued)

FOREIGN PATENT DOCUMENTS

| AU | 20073400905 B2 | 9/2012 |
| DE | 3134224 | 3/1983 |
| EP | 0204354 A1 * | 12/1986 ............ C10G 1/00 |

(Continued)

*Primary Examiner* — Latosha Hines
(74) *Attorney, Agent, or Firm* — Damian Wasserbauer, Esq.; Wasserbauer Law LLC

(57) ABSTRACT

The invention relates to a material and/or fuel which is produced from biomass. The material and/or fuel can be produced according to a method, wherein the biomass is treated at a temperature of over 100 degrees centigrade and a pressure of over 5 bar for a treatment duration of at least 1 hour.

9 Claims, 2 Drawing Sheets

(56) References Cited

U.S. PATENT DOCUMENTS

| | | | |
|---|---|---|---|
| 6,929,754 B2 * | 8/2005 | Espinoza | B01D 29/15 210/193 |
| 2004/0034262 A1 * | 2/2004 | Van de Beld | C10G 1/00 585/240 |
| 2004/0178052 A1 * | 9/2004 | Antal, Jr. | 201/25 |
| 2004/0235966 A1 * | 11/2004 | Bhatt | C10G 2/32 518/716 |
| 2006/0004237 A1 * | 1/2006 | Appel et al. | 585/241 |
| 2006/0096163 A1 * | 5/2006 | Dickinson | C10G 1/00 44/552 |
| 2007/0161715 A1 * | 7/2007 | Long | B01J 8/006 518/718 |

FOREIGN PATENT DOCUMENTS

| | | |
|---|---|---|
| NZ | 57821 | 9/2012 |
| WO | WO2008081407 A3 | 10/2009 |

\* cited by examiner

MATERIAL AND/OR FUEL PRODUCED FROM BIOMASS

RELATED APPLICATIONS

This patent application is a National Stage of International Application Ser. No. PCT/IB2007/055341, filed on Dec. 28, 2007, which claims the benefit of German Application Ser. No. 102006062504.8, filed on Dec. 28, 2006, German Application Ser. No. 102007027594.5, filed on Jun. 12, 2007, German Application Ser. No. 102007056170.0, filed on Nov. 21, 2007, German Application Ser. No. 102007062808.0, filed on Dec. 21, 2007, German Application Ser. No. 102007062809.0, filed on Dec. 21, 2007, German Application Ser. No. 102007062810.0, filed on Dec. 21, 2007 and German Application Ser. No. 102007062811.0, filed on Dec. 21, 2007, the disclosures of which are all incorporated herein by reference in their entireties.

The invention relates to a material and/or fuel which is produced from biomass. The application also relates to an apparatus for the treatment of solid-liquid mixtures, in particular of biomass, comprising at least one reactor for receiving the solid-liquid mixture, a plant for the production of energy from biomass including at least one apparatus for the treatment of the biomass.

A so-called hydrothermal carbonization on a laboratory scale was proposed by Professor Markus Antonietti of the Potsdamer Max-Planck-Institute for Colloids and Interfaces in July 2006. In this method, biomass is converted in a laboratory autoclave at 10 bar and 180 degrees within half a day into a carbon-like material or its preliminary steps and water.

The use of wet biomass for energy recovery by the production of a fuel that is as uniform as possible has been sought after for a long time, but has been limited by a lack of efficiency of the energetic conversion including combustion and low cost-effectiveness in its use. Carbon dioxide and other greenhouse gas emissions have essentially been made responsible for the climate change due to the combustion of fossil fuels or energy carriers.

In DE 197 23 510 C1 for example, a device for the treatment of biogenous residues was presented which comprises a cylindrical reactor in which food waste and the like is submitted to a temperature pressure hydrolysis process. The reactor is in the form of a loop reactor having heatable casing surfaces. A flow is produced within the reactor by means of a pump for ensuring mixing of the suspension.

It is the object of the present application to develop a method by means of which fuels, humus, carbon-containing materials as well as Maillard or Maillard-like reaction products can be manufactured economically and with high efficiency from a solid-liquid mixture, in particular, on an industrial scale.

The object is achieved by the subject of the independent claims. Further developments are apparent from the dependent claims.

A method according to the application provides that the carbon-containing solid-liquid mixture and/or the feed material are additionally processed prior to and/or during the treatment, and/or the reaction, intermediate secondary and/or end products are conditioned or processed. By virtue of this purposeful pre-processing or pre-treatment of the solid-liquid mixture and the further processing of the solid liquid mixture during the treatment or the reaction process and/or the reprocessing of the reaction, intermediate, secondary and/or end products, the yield of fuel, humus, carbon-containing materials and/or Maillard or Maillard-like reaction products can be substantially increased in a cost-effective manner.

In the course of this energetic utilization of biomass, only so much carbon dioxide is set free into the atmosphere as was previously needed by the living plants for their growth. The use of fuels from biomass is thus carbon dioxide neutral and hence climate friendly. Furthermore, the production of humus, which is spread on agricultural effective areas for example, can serve as a —$CO_2$— sink. Without such measures and without an increased energetic use of non-fossil fuels and renewable raw materials, climate protection targets such as those specified in the Kyoto agreement, will hardly be achieved.

With the methods of this application for the utilization of biomass for the production of fuels, the proportion of carbon, which is lost during the conversion process, is substantially smaller than with other methods. Little or no carbon is lost in the course of an orderly conversion process. The carbon loss is over 30 percent with alcoholic fermentation processes, about 50 percent with the conversion into biogas, about 70 percent for a wood carbonization process, and over 90 percent for a composting process. Thereby, carbon is released as carbon dioxide or also as methane, which are each regarded as greenhouse gases and being harmful to the climate. This is not the case with the method of the application in which almost no or only minimal amounts of $CO_2$ is released.

The method according to the application has a high degree of efficiency. By contrast, the alcoholic fermentation only has an estimated net efficiency with regard to the energy yield of three to five percent compared to the energy stored in the original biomass or educts. During the method in accordance with the application, no or only very little $CO_2$ is set free. In contrast, during the conversion of biomass into biogas, about half of the carbon released as $CO_2$. Moreover, only a few substrates are suitable for the economical operation of a biogas plant.

In contrast to most methods known for converting biomass into a fuel, the heat released during the process with the method according to the application can be used for other steps or procedures within the plant itself. One of the main challenges for the energetic utilization of biomass is its high moisture content. In the method of the application however, the presence of water is a prerequisite for the chemical conversion process. In summary, so far the methods applied to an industrial scale for the conversion of biomass into energy are limited in their application by a lack of efficiency, lesser energetic usability and cost-efficiency.

When treating solid-liquid mixtures such as biomass for example at high temperatures and high pressures, the reactors in which the treatment takes place, can have special characteristics. Thus, the inner surface of the reactor can be corrosion-resistant or provided with an appropriate coating due to the extreme conditions. Moreover, a device for the mixing of the solid-liquid mixture can be provided.

The application relates to a method for the production of materials and/or fuels, humus and/or Maillard and/or Maillard-like reaction products from carbon-containing solid-liquid mixtures, wherein the solid-liquid mixture is treated at a temperature of over 100 degrees centigrade and a pressure of over 5 bar for a treatment period of at least 1 hour.

In a further embodiment of the object of the application, the method is carried out in a semi-continuous or continuous manner. This means that the treatment of the solid-liquid mixture is not carried out in a discontinuous manner, that is in a batch mode, in particular during the reaction process.

Temperature and pressure ratios are mainly kept in the operating region for the optimizing reaction space usage and for minimizing the dwelling times. Feed material, catalysts, process water and non-converted feed material and other media can be removed, recycled and returned if necessary, and contraries, reaction, intermediate, secondary and/or end products can be removed from the reaction space during the running process. These and further method steps, as for example the conditioning and/or cleaning of process water, waste water, outlet air, reaction, intermediate, secondary and/or end products can be carried out in parallel in a continuous or delayed manner or in intervals.

In a further embodiment of the object of the application, it is provided that the temperature is adjusted to above 160 degrees centigrade, or between 160 and 300 degrees centigrade, or between 185 and 225 degrees, and/or that the temperature is controlled automatically.

In a further embodiment of the object of the application, it is provided that the pressure is adjusted to above 7 bar, or between 10 and 34 bar, or between 10 and 17 bar, 17 and 26 bar, or 26 and 34 bar.

In a further embodiment of the object of the application, it is provided that the treatment duration is at least 2 hours, or 3 to 60 hours, or 5 to 30 hours or 30 to 60 hours, in particular 6 to 12 hours or 12 to 24 hours.

In a further embodiment of the object of the application, it is provided that the treatment duration or conditions are chosen in dependence on the type of the feed material and/or the solid-liquid mixture and/or the desired reaction product.

In a further embodiment of the object of the application, it is provided that at least one feed material and/or the solid-liquid mixture is pretreated, preferably by dewatering, comminution, preincubation with auxiliary materials, mixing and/or preheating.

Part of the pretreatment can also be the incubation in an acid environment or medium, for example at a pH-value which is below 6, preferably below 5, especially preferred below 4, particularly below 3, and thereby preferably under 2. The necessary duration of the step decreases with increasing comminution and with decreasing pH-value. The incubation at an acidic pH-value can take place after the comminution.

In a further embodiment of the object of the application, it is provided that the feed material and/or the solid-liquid mixture are comminuted prior, during and/or after the treatment, preferably chopped and/or milled. The particle size of the comminuted solid-liquid mixture should thereby be preferably below 10 cm, especially preferred below 1 cm, particularly below 2 mm.

At least one catalyst with or without the addition of water and/or an aqueous solution can be added to the solid-liquid mixture or to at least one of the feed materials before and/or during the treatment. The catalyst can consist of at least one or also several different components. Together they form a catalyst mixture. A component of the catalyst can for example consist of an acid such as a carboxylic acid and particularly a proton acid can be used in a preferable manner. The use of a di- or tricarboxylic acid, and above all, tartaric acid and citric acid has proved to be particularly advantageous. Citric acid and tartaric acid are crystalline and non-toxic. Both occur naturally in fruit (citric acid in citrus fruits as for example lemons, tartaric acid in grapes). But it can for example also be an inorganic acid, preferably sulfuric acid, in a particularly preferred embodiment of the application. The acid which is used as a component of the catalyst can at the same time be used for the production of the acid medium for the incubation step.

In addition, the catalyst or the catalyst mixture can comprise one or more metals and/or metal compounds, in particular also additionally. Transition metals of the secondary groups Ia, IIa, IVa, Va, VIIa and VIIa of the periodic table of the elements as for example iron, nickel, cobalt, copper, zinc, rhodium, palladium, platinum, silver, vanadium, chromium, tungsten, molybdenum and/or titanium are used, whereby iron has proven to be particularly advantageous. Oxides of these metals, for example vanadium oxide, ($V_2O_5$) copper oxide (CuO), zinc oxide (ZnO) and/or chromium oxide ($Cr_2O_3$) are also particularly preferred. But metals of the main groups of the periodic table of the elements or their oxides, for example aluminum oxide ($Al_2O_3$) can also be used as catalyst in an advantageous manner.

In addition or alternatively, biocatalysts can also be used prior to the treatment of the solid-liquid mixture, so as to accelerate the conversion of the solid-liquid mixture to fuels, carbon-containing materials, humus and or Maillard or Maillard-like reactions. Thereby, enzymes, micro-organisms (in particular bacteria and/or fungi), vegetable cells, animal cells and/or cell extracts can for example be used in a free and/or immobilized form. Due to the extreme conditions during the treatment of the solid-liquid mixture, only biocatalysts can be used during the processing of the solid-liquid mixture, in particular the pretreatment, and/or the conditioning of the reaction and/or secondary products.

In a further embodiment of the object of the application, it is provided that at least one of the feed materials and/or the solid-liquid mixture is mixed prior to and/or during the treatment, preferably by stirring, mixing, suspending and/or agitating. Thereby, one or more mixing apparatus(es) can be used for mixing, in particular a combination of different mixing apparatuses, preferably at least a jet vacuum pump or liquid jet mixer, pump or a nozzle. According to the application, mixing apparatuses are preferred which make do without movable parts in the reaction space.

In a further embodiment of the object of the application, it is provided that the reaction products are dried after the treatment with a drier or a combination of different drying methods, preferably a convection or contact drier, especially preferred with a flow and/or belt and/or fluidized bed drier.

In a further embodiment of the object of the application, it is provided that process water accumulated in the course of the method of the application is removed, preferably by at least one apparatus for the solid-liquid separation and/or cleaned and returned to the reaction mixture. The apparatus for the solid-liquid separation can for example be at least one apparatus for micro-, ultra-, nanofiltration and for the reverse osmosis method or a combination of different abovementioned apparatuses, preferably with ceramic filter elements and especially preferred a rotational disk and/or a centrifugal membrane filter.

In a further embodiment of the object of the application, it is provided that accumulated waste water is cleaned mechanically, chemically and/or biologically.

In a further embodiment of the object of the application, it is provided that outlet air accumulated during the treatment, processing and/or conditioning is cleaned or treated mechanically, chemically and/or biologically.

The application also relates to a method, in particular a continuous or semi-continuous process for the industrial production of different reaction, intermediate, secondary and/or end products. The reaction, intermediate, secondary and end products can for example comprise fuels ranging from peat- or turf-, as well as lignite to black coal-like fuels, humus, Maillard- or Maillard-like reaction products, carbon-containing materials such as insulating materials, nano sponges, pellets, fibers, cables, active or sorption coal, charcoal substitute material, highly compacted carbon products and materials, and in particular also feed materials for graphite and graphite-containing or -like products and carbon fibers and feed materials for composite and fiber composite materials.

In a further embodiment of the object of the application, it is provided that the solid-liquid mixture consists at least partially of biomass. The principle of the hydrothermal carbonization is thereby used by the supply of pressure and heat, so as to initially depolymerize and hydrolyze wet biomass while releasing heat energy in the efficient and highly economic method according to the application. The polymerization of the resulting monomers leads to the development of carbon-containing reaction products within a few hours. Desired reaction products are produced in dependence on the reaction conditions. After a shorter reaction duration, humus results initially among others, and, during the further course of the reaction, fuels with increasing carbon content, which are suitable for energy production.

The application also provides the production of different reaction, intermediate, secondary and end products according to the method of the application, including the production of fuels, from peat, and lignite to black coal-like fuels, humus, Maillard- or Maillard-like reaction products, carbon-containing materials such as insulating materials, nano sponges, pellets, fibers, cables, active or sorption coal, charcoal substitute material, highly compacted carbon products and materials, and in particular also feed materials for graphite and graphite-containing or -like products and carbon fibers and feed materials for composite and fiber composite materials.

According to the application, the method can also be a preliminary step for the generation of energy from biomass, wherein a fuel according to the method of the invention is produced, and this fuel is afterwards conditioned for the energy generation. The conditioning can thereby consist for example of a production of pellets or briquettes of dustlike or humus-like fuel. In an advantageous embodiment of this method it is then provided to use the conditioned fuel for energy generation and particularly to combust it. According to the application, a method for the generation of different forms of energy including heat energy and/or electrical current can be carried out, preferably a combination of those while using the fuel produced according to the application. According to the application, different combinations for the generation of different forms of energy of different renewable energy carriers including other solid, liquid and gaseous fuels from renewable raw materials, fossil fuels, water power, solar and/or wind energy and different storage forms of the previously mentioned energy carriers and generation systems can further be used, and using the fuel produced according to the application.

The application further relates to a method for the generation of energy, preferably the type where a steam and/or gas turbine is used, including those methods where the fuel according to the application is used, in combination with storable types of energy by wind power, in particular of pressurized air and especially preferred of the Dispatchable Wind Power Systems (DWPS).

The application further relates to the use of the material or fuel produced according to the application for the generation of energy from biomass.

The application also provides an apparatus which enables an efficient treatment of solid-liquid mixtures on an industrial scale.

In a further embodiment of the object of the application, it is provided that the reactor consists of a cylindrical basic body and/or is formed in a pressure-resistant manner.

In a further embodiment of the object of the application, it is provided that the reactor comprises a cone-shaped base, which forms an angle of at the most 45 degrees in reference to the reactor axis, preferably smaller than 40 degrees, especially preferred smaller than 35 degrees with the reactor axis.

In a further advantageous embodiment of the application, it is provided that the inner space of the reactor, in particular the base or wall parts, consist of heat- and corrosion-resistant and water-repellant material, for example coated metal, particularly noble metal or ceramic materials. The inner space of the reactor, in particular the base or wall regions, and mountings and other parts coming into contact with the reaction mixture are entirely or partially surface-treated and/or coated with a coating material, which prevents or reduces caking or deposits of components of the reaction mixture. The coating material can preferably comprise corrosion-resistant, wear-resistant and/or water-repellant materials, in particular metallic or ceramic materials and alloys, preferably of chromium, nickel, molybdenum, titanium, aluminum, niobium, and of the materials silicon, iron, cobalt, tungsten, boron, and carbon, and in particular of titanium-aluminum compounds. It is particularly provided that the coating material is applied by means of a coating method, preferably by plating, especially preferred by a flame spraying method as for example the high-velocity oxyfuel (HVOF) method.

In a further embodiment of the object of the application, it is provided that at least one membrane part is arranged in the inner space of the reactor. This membrane part can be perforated with holes with distances of less than 10 mm, preferably less than 6 mm, especially preferred less than 4 mm. If the membrane part is formed as sheet metal, it can also be called membrane sheet metal due to the holes. Several membrane parts can be provided in the reactor.

In a further embodiment of the object of the application, it is provided that the diameter of the holes in the membrane part is lower than 400 µm, preferably lower than 100 µm, especially preferred lower than 35 µm.

In a further embodiment of the object of the application, it is provided that the holes in the membrane part are formed in the shape of a funnel.

In a further embodiment of the object of the application, it is provided that at least one cavity is present between the perforated membrane part and the reactor wall. The membrane part can thereby be connected to the reactor wall in such a manner that the cavity is divided into regions separated from one another. With such an embodiment, it is advantageous if at least one region of the cavity is provided with an inlet opening and at least another region of the cavity is provided with an outlet opening. The connection between the membrane part and the reactor wall can take place for example by punctiform or linear welding, whereby welded areas outlining the flow passages are expanded or "pillowed" by the injection of a high-pressure medium in between the parts or sheet plates through which tempering liquid or heat exchange medium can flow through the passageway in between the inlet and outlet opening or coupling, as described in U.S. Pat. No. 4,700,445. In this case, the double wall of the reactor can thus be used as a heat exchanger at the same time.

In a further embodiment of the object of the application, it is provided that at the reactor wall is designed in a double-walled manner, whereby at least one cavity is arranged between an inner wall layer and outer wall layer. The two wall layers or sheet plates can thereby be connected to one another in such a manner that the cavity is divided into regions separated from one another. At least one region of the cavity can be provided with an inlet opening and at least another region of the cavity with an outlet opening or coupling. The connection between both wall layers can for example take place by punctiform or linear welding, whereby the non-welded areas outlining the flow passages are expanded or "pillowed" by the injection of a high-pressure medium in between the parts or sheet plates, through which a tempering liquid or heat exchange medium can flow through the passageway in between the inlet and outlet opening or coupling, as described in U.S. Pat. No. 4,700,445. In this case, the double wall of the reactor can thus be used as a heat exchanger at the same time.

In a further embodiment of the object of the invention it is provided that the reactor is a cascade, tube, cycle reactor, loop and/or a stirring reactor and/or preferably a membrane and/or fluidized bed reactor. At least one reactor or a combination of different reactors preferably have at least one characteristic and preferably combinations of characteristics of a cascade, tube, cycle reactor, and preferably of a loop or a stirring reactor, or especially preferred of a membrane or fluidized bed reactor. At least one reactor comprises especially preferred at least one membrane part and/or at least a device for the generation of a circulating fluidized bed layer.

In a further embodiment of the object of the application, it is provided that the reactor is equipped with a tempering or heat exchange system which can be connected to at least one control unit. The tempering system can comprise at least a screw-in heater in an advantageous manner, at least a heating and cooling coil, at least a half tube coil welded on to the reactor wall, at least a heat exchange tube or a plate and/or at least a membrane part or a perforated base and/or wall part. The tempering system can also comprise a double wall or a double tube construction of the reactor. In a further advantageous embodiment of the application, all apparatuses in the reactor which are flown through by media, including the perforated membrane parts, jet vacuum pump or liquid jet mixers, pumps and nozzles can be part of the tempering system.

The application thereby also provides devices comprising an essentially non-mechanical assembly, that is, no mechanical and/or movable parts, or as few as possible.

In a further embodiment of the object of the application, it is provided that the device is formed as a mixing apparatus for mixing, stirring, agitating of the reactor content. The reactor can also be equipped with a mixing, stirring, agitating and/or cleaning apparatus. For introducing kinetic energy into the reactor content, mechanical stirring and mixing systems with or without movable parts can thereby be used In a further embodiment of the object of the application, it is provided that the mixing apparatus is provided without movable parts and comprises for example at least one jet vacuum pump or liquid jet mixer, at least one liquid pump and/or at least one nozzle.

In a further embodiment of the object of the application, it is provided that the mixing apparatus, in particular the apparatuses in the suction region, are designed in such a manner that the turbulences and shear loads occurring in this region comminute and de-agglomerate the solids.

In a further embodiment of the object of the application, it is provided that the device is a comminution apparatus, in particular for comminuting the solid contents in the reactor, which comprises at least a mill and/or at least a chopper.

In a further embodiment of the object of the application, it is provided that the device is a drying apparatus, which comprises at least one convection or contact drier, or a flow and/or belt drier.

In a further embodiment of the object of the application, it is provided that that the process water conditioning takes place during the running process. The device is then preferably a process water conditioning plant, which preferably comprises at least one sieve, one filter, one hydrocyclone, one centrifuge or an electrical or magnetic separation device. The process water conditioning serves thereby essentially for the separation of solids from the reaction mixture. The process water conditioning plant comprises at least a process water reservoir and/or at least a solid-liquid separation device. In a particularly advantageous embodiment of the application, it is provided that the apparatus for the process water conditioning comprises at least one sieve, filter, centrifuge, hydrocyclone unit, a force field supported separation device or a combination of these. The process conditioning plant can thereby consist of a combination of different or the same separation apparatuses.

The process conditioning plant can also comprise at least one filter plant, in particular a rotational disk filter, preferably with a ceramic disk.

In a further embodiment of the object of the application, it is provided that the device is a biological waste water conditioning plant, which preferably comprises at least one bioreactor, preferably a biomembrane reactor. The bioreactor can thereby comprise at least one loop reactor.

In a further embodiment of the object of the application, it is provided that the loop reactor comprises at least one nozzle for mixing the gaseous and liquid phases.

In a further embodiment of the object of the application, it is provided that the loop reactor comprises a tube in which the flow runs from top to bottom.

In a further embodiment of the object of the application, it is provided that the device is an air cleaning apparatus, which preferably comprises at least one apparatus for cleaning the process and/or outlet air, in particular an air filter.

The use of the apparatus according to the application for the production of fuels, carbon-containing materials and utility materials, humus and/or Maillard or Maillard-like reaction products of biomass can also be provided.

The application also creates a plant which enables an efficient generation of energy for a fuel of biomass on the industrial scale, wherein at least one arrangement is provided for the energy generation.

In an advantageous embodiment of the object of the application, it is provided that the arrangement for the energy generation comprises a combustion plant for the utilization of a solid fuel from biomass, in which the fuels produced in the apparatus according to the application for treating the biomass can be combusted directly and can be used for the generation of combustion gases and water vapor. The combustion plant can be coupled to a turbine and a generator, so that electric current can be generated from the gases generated in the combustion plant and the water vapor. By the arrangement according to the application, more than 43 percent, preferably more than 46 percent, especially preferred 49 percent-55 percent can be realized in a combined gas-steam turbine process for the generation of current with the highest possible efficiency. In order to achieve corrosion prevention, a hot flue gas cleanup is integrated into the thermal power generation system which also helps to achieve better environmentally sustainable emission levels.

The plant comprises at least one reactor of the plant, which is designed for temperatures of at least 100 degrees centigrade, and at least a pressure of above 5 bar. At the same time, a fuel from biomass is used in the plant for operating it, which is produced according to a method which comprises at least the following steps: the treatment of the biomass at a temperature of above 100 degrees centigrade and a pressure of above 5 bar for a treatment duration of at least one hour and processing of the biomass and/or conditioning of the reaction, intermediate, secondary and/or end products.

The arrangement for the energy generation can comprise a pellet oven or a coal dust-fired power plant, wherein a circulating pressurized fluidized bed combustion combined cycle (PFBC) or a coal-fired combined cycle power such as the pressurized pulverized coal combustion (PPCC) can be provided.

The arrangement for the energy generation can comprise a carbon fuel cell.

In a further embodiment of the object of the application, it is provided that the apparatus for treating the biomass comprises at least one reactor for the reception of the biomass and at least a device for the processing of the biomass and/or conditioning of the reaction products and/or secondary products.

In a further embodiment of the object of the application, it is provided that the reactor is a tube reactor, cycle reactor, and especially advantageously a loop reactor or stirring reactor and/or preferably a membrane or fluidized bed reactor. At least one reactor preferably comprises at least one membrane part and/or at least a device for the generation of a circulating fluidized bed layer. At the same time, the reactor is designed for temperatures of at least 100 degrees centigrade, and at least a pressure of above 5 bar.

Several reactors for the reception and treatment of the biomass can be provided to increase the capacity or the flow rate of the plant according to the application. These can be connected in series.

In a further embodiment of the object of the application, the reactor is provided with a tempering system which can be connected to at least one control unit. The tempering system can comprise at least a screw-in heater, at least a heating and cooling coil, at least a half tube coil welded on to the reactor wall, and/or at least a heat exchange tube or a plate. The tempering system can also comprise a double wall or a double tube construction of the reactor.

In a further embodiment of the application, it is provided that the device is formed as a mixing apparatus for mixing, stirring, agitating of the reactor content. The reactor can also be equipped with a mixing, stirring agitating and/or cleaning apparatus. In a further embodiment of the application, it can be provided that the device is a comminution apparatus, in particular for comminuting the solid contents in the reactor, which comprises at least a mill and/or at least a chopper.

In a further embodiment of the object of the application, it can be provided that the device is formed as a drying apparatus, which preferably comprises at least one convection or contact drier, preferably a flow and/or belt drier.

In a further embodiment of the object of the application, it can be provided that the process water conditioning takes place during the running process. The device can then be a process water conditioning plant, which can comprise at least one sieve, a filter, a hydrocyclone, a centrifuge or an electrical or magnetic separation device. The process water conditioning can thereby essentially serve for the separation of solids from the reaction mixture. The process water conditioning plant comprises at least a process water reservoir and/or at least a solid-liquid separation device. In a further embodiment of the object of the application, it can be provided that the apparatus for the process water conditioning comprises at least one sieve, filter, centrifuge, hydrocyclone unit, an electrical or magnetic separation device or a combination of these. The process conditioning device can thereby consist of a combination of different or the same separation devices. The process water conditioning plant can also comprise at least one filter plant, in particular with ceramic disks and also with a rotational disk filter and/or with a centrifugal membrane filter.

In a further embodiment of the object of the application it is provided that the device is a biological, physical or water conditioning plant or a combination of these, which preferably comprises at least one solid-liquid separation, a bioreactor, preferably a biomembrane reactor, a reverse osmosis, microfiltration, ultrafiltration and/or wet oxidation. The bioreactor thereby comprises at least one loop reactor.

In a further embodiment of the object of the application it is provided that the device is an air cleaning apparatus, which preferably comprises at least one device for cleaning the process and/or outlet air, in particular an air filter.

The use of the plant according to the application is particularly advantageous for the generation of energy, in particular electric current.

The application also provides a material and/or fuel which can be produced in an advantageous manner and which comprises improved characteristics compared to the known materials or fuels.

The object is solved according to the application by a material or fuel which is produced from biomass and which comprises, compared to biomass, a carbon fraction which is higher by 1 to 300 percent based on the percentage mass fraction of the elements (dry mass). The material and/or fuel according to the application comprises fuels of peat, lignite to black coal-like fuels, humus, Maillard or Maillard-like reaction products, and carbon-containing materials such as insulating materials, nano sponges, pellets, fibers, cables, pure, purest and ultra pure coal, or active or sorption coal-like materials, charcoal substitute material, highly compressed carbon products and materials, and in particular also feed materials for graphite and graphite-containing or -like products and carbon fibers and feed materials for composite or fiber composite materials.

The material and/or fuel according to the application can comprise a carbon fraction increased by 10 to 300 percent, also 50 to 300 percent, or also 100 to 300 percent, and in particular 200 to 300 percent, compared to the biomass, based on the percentage mass fraction of the elements (dry mass).

The material and/or fuel according to the application can alternatively comprise a carbon fraction increased by 5 to 200 percent, also 10 to 150 percent, also 10 to 120 percent, and particularly 50 to 100 percent, compared to the biomass, based on the percentage mass fraction of the elements (dry mass).

The material and/or fuel according to the application comprises a carbon fraction compared to the feed material of 50 to 90 percent, also of 55 to 80 percent, and also of over 98 to percent, respectively based on the percentage mass fraction of the elements (dry mass).

In a further embodiment of the object of the application, the hydrogen fraction of the material and/or fuel compared to the biomass is reduced by 1 to 300 percent, also 5 to 200 percent, and also 20 to 100 percent, respectively based on the percentage mass fraction of the elements (dry mass).

In a further embodiment of the object of the application, the oxygen fraction of the material and/or fuel compared to the feed material is reduced by 1 to 300 percent, also 5 to 200 percent, and also 15 to 100 percent, respectively based on the percentage mass fraction of the elements (dry mass).

In a further embodiment of the object of the application, the nitrogen fraction of the material and/or fuel is reduced by 1 to 300 percent, preferably 5 to 200 percent, especially preferred 15 to 100 percent, respectively based on the percentage mass fraction of the elements (dry mass).

The material and/or fuel according to the application can comprise at least or more than 65 percent of the original fuel value of the feed materials and in particular the biomass based on the dry mass.

The material and/or fuel according to the application can have, due to its composition and structure compared to the biomass or alternative fossil or biomass fuels, significantly more advantageous and environmentally friendly combustion characteristics, for example due to reduced ash parts, lower chlorine, nitrate, sulfur and heavy metal content, and lower emissions of dust or particulate matter, fine dust and gaseous toxic substances including nitrogen and sulfur oxides.

The material and/or fuel according to the application can further also comprise a higher reactivity and a lower initiation temperature of combustion compared to the biomass or alternative solid fossil or biomass fuels.

When the material and/or fuel according to the application turns sufficiently porous, it can be comminuted with a lower energy expenditure than solid fossil fuels having a comparable fuel value or carbon content.

A large surface results with a small particle size of the material and/or fuel according to the application, in particular a particle size of about 2 nanometers to 50 micrometers, also below one micrometer, and also below 200 nanometer. The material and/or fuel according to the application can than be dried easily due to the small particle size and its large surface.

The material and/or fuel according to the application contains Maillard or Maillard-like reaction products.

In one embodiment of the object of the application, the material and/or fuel of biomass is produced according to a method which comprises at least the following steps: the treatment of the biomass at a temperature of above 100 degrees centigrade and a pressure of above 5 bar for a treatment duration of at least one hour and treatment of the biomass and/or conditioning of the reaction, intermediate, secondary and/or end products The temperature can be adjusted to over 160 degrees centigrade, also between 160 and 300 degrees centigrade, and also between 185 and 225 degrees. The pressure can be adjusted to at least 7 bar, also between 10 and 34 bar, and also between 10 and 17 bar, 18 and 26 bar or 27 and 34 bar. The treatment duration is at least 2 hours, preferably 3 to 60 hours, also 5 to 30 hours or 31 to 60 hours, in particular 6 to 12 hours or 13 to 24 hours. After the treatment of the biomass, the reaction products are dried with a drier, also with a convection or contact drier, with a flow and/or belt, and/or with a fluidized bed drier up to a desired residual moisture content of 6 to 25 percent, also 10 to 20 percent, or also 12 to 15 percent.

The reaction, intermediate, secondary and end products of the method described above comprise fuels ranging from peat, and lignite to black coal-like fuels, humus, Maillard- or Maillard-like reaction products, and carbon-containing materials such as insulating materials, nano sponges, pellets, fibers, cables, active or sorption coal, charcoal substitute material, highly compacted carbon products and materials and in particular also feed materials for graphite and graphite-containing or -like products and carbon fibers and feed materials for composite or fiber composite materials.

The application further relates to the use of the material or fuel produced according to the application for the generation of energy from biomass.

Biomass comprises, contrary to fossil fuels, renewable raw materials which are available in the long term as domestic energy carriers, as well as all liquid and solid organic substances and products of biological and biochemical processes and their conversion products which have a sufficiently high carbon content for this method and which can also otherwise be processed in their composition and property to economically usable reaction, intermediate, secondary and end products by the method according to the invention including fuels. The feed materials are for example among carbohydrates, sugar and starches, agricultural and forestry products, also specially cultivated energy plants (fast growing tree types, reeds, whole grain plants and similar), soy, sugar cane and grain straw, as well as biogenous residual, waste substances and secondary products, plants and plant residues of different origin (grass verges, landscape cultivation goods and similar), agricultural waste including straw, sugar cane leaves, waste grain, unsalable parts of agricultural products as for example potatoes or sugar beets, decomposed silage parts and other fodder leftovers, grass clippings, grain straw, beet leaf, sugar cane leaves, carbon-containing residue and waste materials including organic waste, high-heating value fractions of house and industrial waste (residual waste), sludge, different types and classes of wood including forest wood, timber, pallets, old furniture, saw dust, residues and waste from the food industry including kitchen and food waste, waste vegetables, waste grease and paper and pulp, textiles in particular of natural fibers and natural polymers and animal excrements including liquid manure, horse manure and poultry droppings. Cadavers and in particular animal cadavers can also be counted among biomass.

As treatment of the feed material and/or of the solid-liquid mixture in the sense of the application are to be understood all influences or effects on the solid-liquid mixture which serve for the conversion of the solid-liquid mixture into the reaction products, in particular the supply of energy for the start-up and maintenance of the conversion reaction, including the treatment of the solid-liquid mixture at a temperature of over 100 degrees centigrade and a pressure of over 5 bar.

The processing of the biomass and/or of the solid-liquid mixture in the sense of the application is the treatment of the feed material, reaction and/or intermediate products in different steps before and after the chemical conversion process. The processing comprises all steps, processes and influences or effects on the reaction partners, including the pretreatment and/or after-treatment.

As pretreatment all influences or effects are understood which influence the solid-liquid mixture for the start-up of the conversion reaction until the end of the filling process of the reaction space and the start of the supply of energy. In particular, a preheating of the feed material and a comminution with mainly, that is, more than two thirds of the components of the reaction mixture, particle size of under 10 mm within or outside the reaction space is regarded as pretreatment.

Solid-liquid mixtures in the sense of the application are all suspensions, dispersions and other dispersive systems, including liquid-containing solids, in particular biomass. The method according to the invention finds use particularly for those solid-liquid mixtures which lead to an increase of the content of the liquid phase or to a solvent and/or to the physical or chemical change of the solid which enable an improved solid-liquid separation or changed ratios with higher solid parts during the reaction progress in a physical or chemical manner. Feed material or substances in this context are liquid-containing or non-liquid-containing solids which are used for the production of the solid-liquid mixture.

Reconditioning or conditioning of the reaction products and/or secondary products in the sense of the application comprises all influences or effects on the secondary and/or end products of the conversion reaction, by means of which these are brought into the desired or necessary form.

The semi-continuous or continuous method in the sense of the application is to be understood as the production of reaction, intermediate, secondary and end products on a pilot plant station and/or industrial scale, in which at least one criterion, or also two or also more of the criteria cited below are fulfilled:

1. The temperature, in particular in at least one pressure vessel, reactor or plant component across at least two reaction cycles continually lies above 40 to 90 degrees centigrade, preferably from 60 to 70 degrees centigrade and/or above the boiling temperatures of the process water at one bar absolute pressure, so that a prolonged direct skin contact e.g. with one hand on the vessel or container wall, which is directly in contact with the reaction mixture of more than one minute without increased visible skin redness is only possible with auxiliary means, insulating substances or additional apparatuses.
2. The pressure, in particular in at least one pressure vessel, reactor or plant component continually lies above one bar absolute pressure or the environmental pressure across at least two reaction cycles. At least two containers, at least one of these a reactor, are connected in such a manner that a transport, a pressure equalization or the storage of compressed media can be realized.
3. The processing of the feed materials, solid-liquid mixtures, reaction, secondary, intermediate and/or end products or other reaction participants is carried out in more than one container or vessel within the plant.
4. The entire volume of the containers or vessels in which this processing takes place and which are each integral or essential components of the plants, is at least 500 liters, whereby at least one of these containers or vessels shall be moved not only by hand but only with additional auxiliary means.
5. During a reaction cycle, a pretreated carbon-containing solid-liquid mixture and/or different types of feed material, biomasses or carbon compounds are used, in particular of different composition and consistency.
6. Different feed material of the solid-liquid mixtures, reaction, secondary, intermediate and/or end products and/or other reaction participants, including catalysts and/or propellant or tempering media as for example water, in particular process water and/or gas such as process/synthetic gas are supplied to or withdrawn from the reaction mixture simultaneously, in a time-lapsed manner, continually, discontinually or in intervals.
7. The processes under 6. take place while the temperature of the pressure vessel, reactor or other plant components is above 60 to 70 degrees centigrade or above the boiling temperatures of the process water at one bar absolute pressure or while the pressure of at least one plant component lies above one bar absolute pressure.
8. The reaction mixture is treated within a coherent process, in particular within one single plant.
9. The feed material or the reaction mixture are set in motion before and/or during the reaction cycle by the introduction of kinetic energy, in particular by at least one stifling or mixing system or a combination of stirring or mixing systems no matter of which type, preferably with cooperation of at least one non-mechanical stirring or mixing system, whereby, when using a single system, this does not comprise a magnetic coupling with only one shaft and is at the same time also not operated electrically.
10. Thermal energy is supplied to or withdrawn from the feed material or the reaction mixture before or during the cycle, in particular with the use of at least one tempering system or a combination of different systems or apparatuses, whereby, during the use of a single system, this is preferably not a commercially available oven and/or does not comprise a wall-side heat transfer by a heated casing container which can be separated by a few hand grips.

A container is to be understood as an object open or closed at the top having a cavity on its inside which particularly serves for the purpose to separate its content from its environment. A container in which the conversion reaction, that is the treatment of the solid-liquid mixture, and/or the processing of the solid-liquid mixture is carried out, for example a pressure vessel or a reactor is formed by a reaction space or pressure container space closed to the outside.

As a reactor is particularly described a container in which decisive reaction steps take place. As decisive reaction steps are particularly understood the steps which run to a great extent for example in a temperature and pressure region, which has to be present on average to be able to convert at least 10 to 30 percent of the feed material into one of the mentioned reaction, intermediate, secondary or end product.

Reaction spaces or pressure container spaces are defined by the existence of spatial regions also within only one reaction or pressure container space, in which are present reaction conditions which are measurably deviant from one another. A deviant reaction condition thereby comes about through a constructive, mechanical, dependent on flow and/or phase, chemical, electrical or electrochemical or other type of influence. The apparatus used for this purpose goes beyond an autoclave for laboratory purposes equipped with an electrically operated stirring or mixing system with a single shaft with magnetic coupling and features a wall-side heat transfer of a compression-loaded smooth inner side of the outer reactor wall by an electrically heated casing container which can be separated with a few hand grips.

The reaction cycle, cycle or reaction is to be understood as the duration of a single conversion reaction which starts with the introduction of the starting products into the reaction space and the supply of energy which serves for the start-up of the conversion reaction. A cycle lasts from the start of the reaction process to the existence of the desired reaction product in the reaction mixture without after-treatment or conditioning, or until the completion of the reaction process.

Apparatuses which transfer the energy to the reaction mixture mechanically or by means of ultrasound, depending on flow, thermically or depending on construction and thereby effect a movement of the reactor content by stirring or agitation are among the stirring or mixing systems. The movement of the reaction mixture by apparatuses such as pumps, liquid stream mixers or jet vacuum pumps, spray valves or jet nozzles and mechanical and thermal mixers or the direction of the reaction mixture along pressure gradients are also among these.

A plant consists of at least two apparatuses or devices for carrying out the method according to application. At least two containers or vessels, at least one of these a reactor, can be connected in such a manner that a pressure equalization or the storage of compressed media can be realized. An integral or essential component of the plant is an apparatus or a container when, in the case of a failure of this component, the efficiency of the method is restricted in particular in view of its cost-effectiveness by at least two, or by five, and by at least ten percent.

A coherent process is present if apparatuses or devices of a plant are commonly used. More than 200 kilograms of feed material can be processed in such a plant per week in relation to the dry matter. A plant is commonly used when apparatuses or devices are connected to one another or by line connections or spatially by methods which allow an exchange of starting, intermediate, secondary and reaction products and also other reaction participants or the common use of the same within a radius of 50 km.

The start or the initiation of the reaction or of the reaction process is characterized by the achievement of at least one target parameter of the reaction procedure including pressure or temperature, where the conversion reaction of the hydrothermal carbonization can take place over a period of at least one hour. The end of the reaction process is characterized by the continual leaving of at least one of the target parameters of the reaction procedure prior to the emptying of the reaction space.

Reaction, intermediate or secondary products or partners in the sense of the application are all solid, liquid and gaseous substances which are or have been under operation conditions (pressure higher than 5 bar, temperature higher than 100 degrees) independently of their length of stay in the reaction space.

Solid-liquid-mixtures in the sense of the application are all suspensions, dispersions and other disperse systems, including liquid-containing solids, in particular biomass. The device according to the application is in particular used for those solid-liquid mixtures which lead, during the reaction process, to an increase of the content of the liquid phase or to solvent and/or to the physical or chemical change of the solid which enable an improved solid-liquid separation or changed ratios with higher solid parts.

Suspensions and dispersions are both heterogeneous solid-liquid mixtures. A heterogeneous (immiscible) substance mixture of a liquid and a solid is to be understood as a suspension. A suspension has at least one solid phase and at least one liquid phase. Colloidal dispersions, micelles, vesicles, emulsions, gels and aerosols as for example paints, emulsions or foams are among the disperse systems, that is binary mixtures of small particles and a continual dispersion medium.

Maillard-like reaction products in the sense of the application are to be understood as compounds which are intermediate, secondary, end products or reaction partners of Maillard reaction products and which can possess similar chemical, physical or biological properties. The advanced glycation end products (AGE) which are generated by rearrangement of the primary Amadori products are among these compounds and which further react to the end products of the Maillard reaction, the advanced glycation end products (AGE). The AGEs can form crosslinks with other proteins through rearrangement and polymerization. Due to the development path, there are numerous different and complex forms of AGEs, whereby Nε-(carboxymethyl)lysine (CML), furosine and pentosidine have been examined most intensely up to now.

Polytetrafluoroethylene (PTFE)-like substances are to be understood as substances and compounds of similar or related or non-related classes having at least one or several characteristics of polytetrafluoroethylene as for example reaction inertness, very low friction coefficient, very low refractive index, high heat resistance, low adhesion durability of surface contaminations or smooth surface.

Fuels are substances which serve for the energy production and which are converted into energy by means of chemical, electrical or other methods.

Materials or utility materials are substances which are processed into a product by further processing, treatment or conditioning or which go into an end product as work objects.

The object of the application is exemplified in more detail in the following.

The process of the material conversion of the feed material or of the biomass in the method according to the invention can roughly be divided into the following phases:

1. Heating phase: The biomass is brought to a temperature and pressure. The depolymerization phase is initiated by the supply of energy. In particular with biomasses having a high carbohydrate content, swelling reactions initially already result during the heating phase. Water is thereby placed between polysaccharides in the cell wall. During the swelling process, gelatinous, in the further course colloidal structures also form temporarily, which dissolve again during the further course of the depolymerization phase.

2. Depolymerization phase: Here, the original structural proteins are dissolved, which, in particular in the case of plant or lignocellulosic biomass, mainly consist of polymerized structural proteins cellulose, hemicellulose and lignin. Monomer and oligomere carbon compounds form. The higher the protortion of resistant and crosslinked structural proteins, and the smaller the surface of the feed material, the more time is needed for the depolymerization phase. Simultaneously, hydrolysis results, that is, a chemical reaction-, in which chemical compounds are broken down by reaction with water. The higher the proportion of carbohydrates, non-plant and non-structural proteins and fats, respectively the lower the proportion of ligno-cellulosic biomass, the faster this phase progresses. Towards the end of this phase, the heat energy release increases and a substance similar to raw oil is formed.

3. Polymerization phase: The monomerized and non-crosslinked carbon compounds are newly structured and crosslinked. Agglomerates form, which macroscopically resemble the original rough structures of the feed material, but which have lost the inner cohesion with regard to the superordinated structure and thereby also their resistance and firmness. The newly formed structures which comprise a higher brittleness and porosity consist of small particles with a diameter of a few hundred micrometers to 5 nanometers and smaller in the intermediate and also in the end states. New carbon compounds form which have similarity to those of natural coal. They consist, amongst others, of different carbon compounds and terpene derivatives, the carbon content of which increases, and the hydrogen and oxygen fractions of which relating to the percentual mass fraction of the elements (dry mass) decrease. One of the distinguishing features compared to the fossil fuels is the presence of Maillard reaction products in the liquid and solid phase of the reaction products.
4. Stabilization phase: While the depolarization and the polymerization phase progress in an exothermal manner, the heat energy release in this phase decreases considerably and the reaction runs out in the stabilization phase and finally comes to a standstill.

The characteristics of the reaction product such as degree of purity, form, structure, density, mechanical resistance or strength, particle size, surface structure, composition, combustion characteristics, fuel value and energy content depend on the methods or reaction conditions, that is, the parameters which are responsible for the control of the method according to the application, that is, for the process procedure. The course of the reaction or the process procedure is influenced by the following treatment or reaction conditions or criteria amongst others:

1. Composition and characteristics of the educts or feed material including density, particle size, moisture content, purity, carbon, mineral and alkali content.
2. Relationship between the solid and liquid phase or dry mass and process water.
3. Temperature, pressure and the variation limit of these parameters.
4. Catalysts: choice, composition, concentrations, particle size, mixture ratio and supply times. The reaction can be accelerated, manipulated or directed by the supply of catalysts or catalyst mixtures at later times in the reaction progress. The characteristics of the reaction product can thereby be influenced. The particle size of the metallic catalyst forms an essential part for the formation and structure of the reaction products. The reaction time is significantly determined by the strength of the acid (pKs value).
5. Heat exchange or tempering systems and time of temperature adjustments, pH-value, concentration ratios, also in the process water.
6. Material or chemical changes of the reaction mixture for example by hydrolysis: amongst others increase of density and porosity during the conversion reaction.
7. Duration of the polymerization, as the faster the progress of the polymerization, the purer the reaction product.
8. Method and manner in which the reactor content is mixed or agitated and the energy is transferred into the same, as well as flow velocity and shear forces and mixing intervals and times.
9. Process water: concentration of alkali salts, acids, elements such as chlorine, sulfur and their salts and metals and minerals including phosphorous and nitrate compounds. Cleaning methods of the process water during and outside the running process.
10. Concentration of contraries as for example sand or substances which hinder, slow down, delay the reaction progress or lead to undesired secondary products or precipitations.
11. Type of the execution including the intensity and duration of the method steps mentioned here.
12. Choice, combination, cooperation and control of the tempering and mixing systems.
13. Choice, combination, performance and efficiency of the process water conditioning and guidance including consideration of the necessary adjustment to variable reaction volumes by the process water and substance supply or withdrawal.

Further method steps can be the following:
1. Provision of feed material including biomass, feed material, catalysts and water.
2. Pretreatment
3. Transfer of the feed material into a transport system and/or container.
4. Transfer of the feed material into the container suitable for the respective processing or treatment step.
5. Dewatering and/or drying of the feed material
6. Comminution of the feed material and possibly of the catalysts
7. Removal of metal and contraries
8. Incubation with catalyst, in particular with acid
9. Admixture of one or several further catalysts
10. Preheating of the biomass
11. Compaction, for example while introducing into the reactor
12. Introduction into the pressure container or reaction space
13. Heating
14. Process water conditioning and air cleaning
15. Removal of the reaction product from the reaction space
16. Separation of reaction, intermediate, secondary and/or end products from the reaction mixture
17. Drying of the desired reaction product
18. Comminution of the desired reaction product
19. Cooling of the desired reaction product
20. Conditioning
21. Energy recovery, in particular through thermal recycling or heat exchange.

The feed material and the reaction, intermediate, secondary and/or end products are processed in different steps before and after the chemical conversion process. The processing steps aim for a substance conversion in the industrial or technical measure. Thus, processing is to be understood as more than a manual disassembly or a manual comminution with a pair of scissors. The processing of the biomass and/or the reconditioning of the reaction products and/or the secondary products in the method according to the invention goes beyond an electrically operated stirring or mixing system with a single shaft with magnetic coupling and features a wall-side heat transfer of a compression-loaded smooth inner side of the outer reactor wall by an electrically heated casing container which can be separated with a few hand grips. It also comprises the criteria mentioned for the stirring or mixing system and/or tempering system mentioned under point 9 and 10 for the semi-continuous or continuous method.

The biomass can usually already be comminuted before the storage, and particularly before the actual conversion process, in particular before and/or after the filling into the reaction space. The comminution particularly takes place in a mechanical manner preferably by chaffing and particularly preferred by means of an apparatus for milling for example of a grinder or a roller mill Different chaffing and/or mill types are used depending on the feed material and the desired particle size. The particle size influences the reaction progress. Thus, the smaller the particle size, the larger is the surface of the feed material. The larger the surface of the reaction partners, the faster is the chemical conversion. The particle size of the comminuted biomass can thus be under 10 cm, also under 1 cm, and also under 2 mm. The energy, time and material effort during the comminution process is thereby dependent on the process procedure and in particular on the configuration of the feed material, particle size and length of stay.

The incubation in an acid environment or medium with a pH-value which is below 6, also below 5, and also below 4, particularly below 3, and thereby also under 2, is part of the pretreatment. The necessary time of this step decreases with increasing comminution and with decreasing pH-value. The incubation at an acidic pH-value can for example take place after the comminution.

In particular metallic, inorganic or sand-like substances and other contraries are separated from the biomass. Methods and processes are used within the scope of the treatment of the biomass and organic waste which are established for example in biogas plants.

A catalyst with or without addition of water and/or in an aqueous solution can be added after the pre-incubation in the acid medium. The catalyst can consist of at least one or also several different components. These together then form a catalyst mixture. A component of the catalyst can for example consist of an acid. The reaction procedure is influenced to a great extent by the choice, composition, concentration, particle size, mixing ratio and supply times of the catalysts. The factors depending on the catalysts therefore have a large influence on the forming, design and characteristics of the end product. The particle size of the metallic catalyst forms an essential part for the formation and structure of the end or reaction product. The reaction time is also determined by the strength of the acid (pKs value). If, for example, particles smaller than ten micrometers, preferably 200 to 1000 nanometers, and particularly preferred 10 to 199 nanometers are used, the probability of the formation of uniformly formed fiber-like nanostructures is increased. The smaller the particle size, the more precise and uniform the fiber-like structures of the new carbon compounds can be defined. However, the carbohydrate content, the particle size and the degree of uniformity of the particle size all play a role for the direction of the reaction progress for the production of defined nanostructures. The reaction can be accelerated and directed by means of the timing of the supply of catalysts or catalyst mixtures. The introduction of a catalyst can also be useful at later times during the reaction process depending on the desired end product. Inorganic acids are also used as acids, preferably mineral acids, particularly preferred strong acids, that is, acids having a pKs as low as possible. The acids and their reaction products which are used are to be non-poisonous and have a minimum corrosive effect. They are furthermore not to be detectable in the reaction product and material components of the acids are to be purified or disposed as easy as possible. Sulfuric acid which is also used as a food additive, fulfills most of the requirements and is therefore particularly suitable. Different acids can also be combined. Alternatively or additionally, carboxylic acids and in particular proton acids are used. The use of a di- or tricarboxylic acid, and above all, tartaric acid and citric acid has proved to be particularly advantageous. Citric acid and tartaric acid are crystalline and non-toxic. Both occur naturally in fruit (citric acid in citrus fruits as for example lemons, tartaric acid in grapes). The acid which is used as catalyst component can at the same time be used for the production of the acid medium for the incubation step. The concentration of the acid is, amongst others, dependent on the pKs-value and is approximately 0.1 to 3 percent, 0.6 to 2 percent and particularly preferred 0.3 to 1 percent based on the volume. A pre-incubation of the feed material with acid reduces the reaction time. The longer the preincubation, the stronger the acid and the higher its concentration, the shorter the reaction time. The catalyst or the catalyst mixture can comprise, in addition to others, one or more metals. Preferably, transition metals such as iron, nickel, cobalt, iron, copper, chromium, tungsten, molybdenum or titanium are used, whereby iron has been proven to be particularly advantageous. The addition of the catalyst can take place before the introduction into the reactor, but also at other times during the method. Different catalyst mixtures or compositions can furthermore be added to the reaction mixture at different times.

The biomass is thoroughly mixed with the catalyst or the catalyst mixture. The catalyst then forms, together with the biomass, a reaction mixture. The mixing process alternatively takes place within a reactor. The compaction of the reaction mixture can take place in one or several steps outside or within a reactor. A high compaction is advantageous, which again means a better usage of the reaction space. The measure of the compaction depends on the transferability into a reactor, from the desired reaction product and from the process procedure. The reaction mixture can for example also be introduced into a reactor after the pretreatment.

A preheating can for example occur before the introduction of reaction components into the pressure container space. All reaction partners can be preheated. Among the feed material, all, but in particular the biomass, can be heated to approximately 60-90 degrees centigrade. The preheating takes place for example by the supply of heat energy and in particular by addition of process water close to boiling, a preheated biomass suspension or other water at about one bar absolute pressure or by the supply of water or process steam or other heat energy carriers. Heat energy from heat exchanger processes can alternatively or additionally be used for this.

The reaction time is, depending on the desired reaction product, between one to 60 hours, preferably between three and 40 hours, particularly preferred between five and 18 hours. The reaction time is considered as finished or the reaction as terminated, when no noteworthy enthalpy is released anymore. A minimal pretreatment and/or the omission of individual pretreatment steps can increase the reaction time to over 60 hours. The reaction time particularly depends on the composition and the characteristics of the respective feed material. The larger the surface, the smaller the particle size, the smaller the lignin or cellulose proportion and the larger the carbohydrate proportion, the faster the heat energy is released in the depolymerization phase and the faster the stabilization phase is reached and the reaction or retention time is reduced. The shorter the conversion time of the respective feed material, the greater the delay can be for example the introduction into an already running reaction in the reactor. A shorter reaction time is also achieved with relative large proportions of fat and non-vegetable, non-crosslinked, for example animal or bacterial proteins. The expiration of the heat energy release during the reaction process is an indicator for the end of the conversion process.

According to the application, temperatures of up to 300 degrees centigrade can be achieved. But temperatures between 185 to 205 degrees centigrade are advantageous, and in particular to 215 degrees centigrade and particularly preferred to 225 degrees centigrade.

According to the application, a pressure is built up under exclusion of air, which is for example between 7 and 90 bar. A pressure between 11 and 18 bar is advantageous, also between 18 and 26 bar, and also between 26 and 34 bar.

Figure 1:
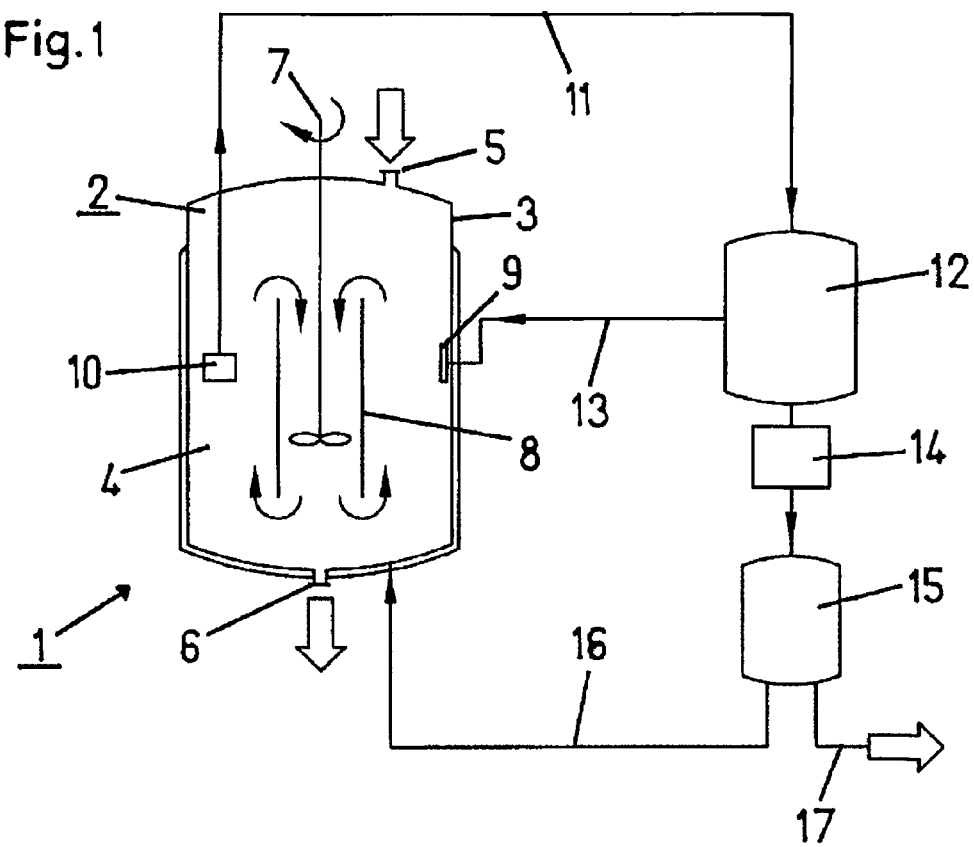
FIG. 1 shows a schematic longitudinal section of a reactor according to the application with further components of a plant according to the application.

The apparatus according to the application comprises a reactor which can be developed differently in dependence on the processes progressing therein, the used amount and the type of the solids and/or of the desired reaction product. At least one of the reactors according to the application can for example be a cascade, tube, circuit, loop, membrane, fluidized bed and/or a stirring vessel or a stirring vessel reactor or comprise individual characteristics or a combination of different characteristics of these reactors. The fluidized bed of the reactor is preferably circulating. The reactor according to the application or a combination of the different reactors can be used for different treatment times and processing steps within a plant. Furthermore, the reactor can be designed as a pressure vessel due to the necessary pressure. The design of the pressure vessel form depends on the process procedure and on the mixing technique used.

In a further embodiment of the object of the invention, the reactor is formed as a type of multi membrane fluidized bed reactor with a circulating fluidized bed. Such a reactor combines the advantageous characteristics of different membrane and fluidized bed reactor types. In this context, a fluidized bed is to be understood as a ballasting or a collection of solid particles which is brought into a fluidized state by an upwardly directed flow of a fluid. The term 'fluidized' in this context suggests that the (former) ballasting now comprises fluid-similar characteristics (e.g. those of water). A solid-liquid mixture is present on the inside of the reactor according to the application. The fine-grained or particulate ballasting of the solid is agitated if it is passed through by the gas or the liquid—the so-called fluid medium—from bottom to top. The fluid medium has to pass through at a high enough velocity to lift the particles so that they are agitated. The necessary energy input depends on the respective reaction conditions. Due to the agitation, the particles of the solid phase can easily be—partially but also continually—removed from the reaction space when the reaction is completed. Fresh solid material can correspondingly be refilled. The velocity of the fluid stream is adjusted so that the solid is agitated at least in such a manner that a stationary fluidized bed is formed. The fluid velocity in this state is nevertheless lower than the sinking velocity of the particles. By combining individual adjacent particles, their stream resistance is higher than the stream resistance of a single particle. This can lead to the formation of a suspension layer with a defined surface. The velocity of the fluid stream can be increased by the application of higher pressures to the membrane parts. Relatively many particles are discharged from the base zone by the higher fluid stream, and the upper layer boundary dissolves. A certain proportion of the solid still falls back into the base zone in the fluidized bed. A stream is formed in the so-called free space above the dense zone, where the solid rises as a thin suspension in the relatively wide core, while the solid moves downwards in clusters at a high velocity at the edge of the reactor. By the positioning of the at least four liquid stream mixers, which are distributed on the diameter in manner as even as possible and with vertical distances as evenly as possible, and additional mixers, which also include the surfaces immediately above the base metal sheets, the formation of agglomerates and layer boundaries is suppressed, so that a relatively homogenous agitation of the particles takes place.

The following advantages can be achieved with the reactor according to the invention when used appropriately, in particular when using membrane parts, amongst others:

1. The turbulences produced by the accelerated propellant and fluid streams lead to high relative velocity between the continual fluids and the disperse solid phase
2. frequent particle-particle impact and also particle-wall impact
3. intensive mixing of the particles
4. accelerated heat exchange of the reaction mixture with the fluid minimizing of deposits
5. controlled dosing of for example water and reactants during the reaction process.

The reactor according to the application can have one or more of the following characteristics.

The reactor can comprise at least one pressure container and at least one apparatus for the solid-liquid separation and is then also called a membrane reactor. The reactor can have at least one coarse and/or a fine filtration or a combination of both apparatuses, which can also be combined into a filtration apparatus. At least one of the pressure vessels can have a stirring and/or mixing system, which can thereby be called stirring vessel reactor. The sum of all reaction spaces of the pressure vessels or reactors can have a volume of 0.5 to 10,000 cubic meters, also of 5 to 2,000 cubic meters, and also of 50 to 500 cubic meters. The sum of all containers of a plant including the reaction spaces of the pressure vessels or reactors, hoppers and storage spaces can have a volume of 0.5 to 10,000 cubic meters, also 10,000 to 70,000 cubic meters, and also 50,000 to 500,000 cubic meters. Depending on the feed material and the biomass, the water content of the biomass can be up to 95 percent or more of the total weight. The integration of a dewatering process which precedes the conversion reaction can be useful for this reason. Due to the high moisture content and the low packed weight of many biomasses, the transferability is limited, so that the initial solid proportion in the reaction space can be approximately between 5 and 30 percent. The yield of the reaction product can thereby be in the region of a single FIGURE percentage related to the total reaction space volume. As a consequence, a relatively large reaction space volume is necessary. Large reaction space volumes can be realized by connecting several pressure vessels or reactors. By connecting them, for example in the sense of a cascade, and/or the combination of different reactor types, a more advantageous retention time distribution and therefore higher operational capacity can be realized through an improved control of the process progress. At the same time, the different requirements of the different reaction phases and partial steps can be accommodated. A more favorable heat exchange can for example take place in a tube reactor, a better mixing and remixing in a stirring vessel or stirring reactor. By the breakdown of the entire volume of the reactor into several pressure vessels, the ability to transport individual plant components including the pressure vessel is improved. By the connection of several pressure vessels or reactors, the realization of a continuous or semi-continuous process is facilitated. At least one pressure vessel for the reception of the compressed process gas formed or contained in the reactors can be used and integrated into the plant.

The solid portion can be increased during the method by continual separation or withdrawal of single reactants as for example water during the process progress. The solid content can increase from for example originally 15 percent to 20 to 30 percent, preferably to 31 to 45 and particularly preferred from 46 to 70 percent, depending on the reaction procedure or treatment conditions. The volume per reactor can simultaneously decrease as the reaction progresses. At the same time, feed material which can be converted faster can be added so that a higher operational capacity at a given reactor volume can be achieved. A connection of several reactors in series which are for example separated by valves, further enables a selective filling or refilling of individual pressure vessels with fresh feed material, reactants or catalysts for the purpose of increasing the throughput. The transfer of the reaction mixture from one pressure vessel to the next essentially takes place at operating conditions. The reactor and all surfaces and components of the apparatus in contact with the reactants including the mountings and tube lines consist of heat-resistant and corrosion-resistant materials, and indeed preferably of stainless steel comparable to the quality as described below for the membrane parts. The wall thickness of the reactor is designed for pressures between 7 to 20 bar, preferably for pressures between 20 to 30 bar and particularly preferred for pressures of 30 to 40 bar, and for temperatures between 160 and 230 degrees centigrade, preferably to 260 degrees centigrade, and particularly preferred to 300 degrees centigrade. The temperature, in particular in at least one pressure vessel, reactor or plant component lies above at least two reaction cycles continually above 40 to 90 degrees Celsius, preferably from 60 to 70 degrees centigrade and/or above the boiling temperatures of the process water at one bar absolute pressure, so that a prolonged direct skin contact e.g. with one hand with the container or vessel wall, which is directly in contact with the reaction mixture, of more than one minute without increased visible skin redness is only possible with auxiliary means, insulating substances or additional apparatuses.

The reactor according to the application can comprise a vertical cylindrical basic body. The upper base can be formed as a torospherical base. In the upper part, preferably the upper half, and particularly preferred in the upper two thirds, it can comprise a conical form with a slowly growing diameter towards the bottom. The cone-shaped base can comprise an angle to the reactor axis of 45 degrees, preferably smaller than 40 degrees, and particularly preferred smaller than 35 degrees. The transition of for example from the wall to the base region can be rounded to minimize disruption of the flow. The placement of the nozzle for the supply of the reaction mixture can be variable and is for example in the upper half, preferably in the upper third of the pressure vessel. The supply can take place via a valve via the outlet nozzle which is approximately in the centre of the base or the cone base. The components and the nozzles of the reactor can be connected by welding. The lid can be mounted. With a preferential use of liquid stream mixers or jet vacuum pumps and full jet nozzles, the ratio of the diameter to the height can be approximately at one to two to one to three, but also at one to four to one to five, and also at one to five to one to six.

A membrane reactor is an apparatus which allows the combination of at least one chemical reaction with a membrane method or a solid-liquid separation. Thereby, both processes are coupled integrally, so that synergies can develop. Both processes can be accommodated simultaneously in a single housing or a plant. During the chemical reaction, at least one component of the reaction mixture is converted. By the use of a membrane reactor, reaction, intermediate, secondary and end products can selectively be removed from the reaction mixture, educts can be added in a controlled manner, or the contact of the educts can be intensified. Reaction, intermediate, secondary and end products, and in particular water is removed continually or in intervals from the reaction mixture. A distinct increase of the throughput can thereby be achieved. The removal of gaseous media or substances and in particular of dissolved oxygen can also be of advantage for the reaction progress and for the reduction of corrosions. The solid-liquid separation is facilitated by the chemical change of the composition and characteristics including the density, in particular during the polymerization phase. Thereby, a higher solid concentration can be achieved in the reaction mixture. The reaction mixture is transferred into a loop reactor in dependence on the solid content and the state of the conversion process. The reaction mixture flows thereby through a radial inner cylinder section axially in a first direction and axially in a second opposite direction. The inner tube can for example be provided with heat exchanger elements when using a loop reactor, so as to accelerate the heat exchange and to thus enable larger reactor diameters. The inner tube is also called insertion or guide tube. The diameter of the guide tube influences the friction and the deflection losses of the loop flow. This increases with decreasing diameters and while the length remains unchanged. If a diameter is chosen that is too large, the loop flow can collapse. The diameter of the insertion tube can thereby be approximately a quarter up to a third, at the most half of the diameter of the reactor. The guide tube can be positioned with a distance of approximately a third, preferably of a fourth from the reactor base.

Reductive relationships are present in the reaction mixture. Due to the acid environment, the presence of corrosive substances such as chlorine, high temperatures and pressures, the surfaces which come into contact with the reaction mixture under operating conditions, are at risk of corrosion. Thereby, wear can appear in particular during long-term operation through localized corrosion. Either firmly installed membrane parts or a fluid-permeable cartridge are used in dependence on the diameter for minimizing corrosion.

Membrane parts consist of perforated elements, preferably metal sheets which enable the transport in particular of gases and liquids through the element. The fluid and gas-permeable cartridge also consists of perforated mostly metallic components, through which the purified propellant, solvent or water can flow into the reactor space. If a membrane part or a fluid-permeable cartridge is used respectively, this primarily depends on the diameter of the respective reaction vessel and the tolerances during the processing, but also on the form and the corrosion load. Plastics, metals, in particular hard metals, ceramic materials and polytetrafluoroethylene and preferably stainless steel and particularly preferred the alloys used for stainless steel mentioned for the membrane parts are considered as possible materials or coating substances or carrier materials. The coating usually goes beyond a simple removable cartridge of polytetrafluoroethylene which it is for example used with autoclaves on the laboratory scale. Chemical, mechanical, thermal and thermo-mechanical methods are used for applying the coating. The material to be applied, the carrier material and/or the adhesive agent are thereby present in a gaseous, dissolved or solid form. Galvanic or flame spraying methods as for example the high velocity oxy-fuel (HVOF) method are preferably used. A technique for applying the coating is plating.

Alternatively or additionally to the plating, the inner space of one or several containers of the plant can be equipped with a cartridge. The inner wall of the reactor can particularly be lined with membrane parts. The cartridge has predominantly a cylindrical form and can bear on a grid, that is, a net-like structure.

Alternatively, a stainless steel casing, comparable to a heat exchanger plate system, is deposited either on the outer or inner stainless steel layers of the reactor or the cartridge. The steel plates are connected by punctiform or linear welding, whereby the non-welded areas outlining the flow passages are expanded or "pillowed" by the injection of a high-pressure medium in between the parts or sheet plates, through which a tempering liquid or heat exchange medium can be passed through the passageway. Different media can then be passed through these cavities. These media can also serve as heat carriers, which can be among sufficiently processed process water, fresh water or water vapor or thermal oil.

So as to minimize the pressure load of the stainless steel casing which is turned towards the reactor space, apparatuses are used by which a pressure difference as small as possible arises between the cavity and the reactor space. Possible pressure differences in the cavity can be prevented or minimized by holes which are drilled into the stainless steel casing by means of a laser. The diameter and the form of the holes correspond to those in the membrane parts or in the cartridge. The distances of the holes can also be apart from one another as much as possible, so that as little as possible medium reaches the reaction space.

The bores in the casing and in the cartridge have a distance of at least 10 to 20 cm, also of at least 60 cm and also at least 150 cm. The medium reaches the inner reactor space through the bores in the inner reactor space or in the cavity between the reactor wall and the cartridge by the overpressure present on the casing circuit. Flow passages are generated by the connection of individual punctiform or linear welding circuits by a laser seam, so that an even distribution of the tempering medium is ensured in the casing. The pressure which is present in this tempering system exceeds the inner pressure of the reactor by up to 6 bars. The outer casing of the cartridge abuts the inner side of the pressure vessel directly. Alternatively, it can abut a perforated grid or webs. The cartridge comprises regular bores with a diameter of about 20 to 70 micrometers.

When plated metal sheets are used, an inner casing can be applied in addition to the one- or two-sided plating and/or after occurrence of signs of wear, a casing is connected by a welding method and preferably by laser welding. Cavities as above with the outer casing of the cartridge are generated for the use of the inner casing at the same time. The inner casing has a thickness of 1 to 1.5 mm, also 1.5 to 2 mm, or also of 2 to 2.5 mm Pressure losses are minimal and are additionally minimized by the number and size of the inlet and outlet nozzles.

The cartridge or the membrane parts of steel or particularly stainless steel especially austenitic steels and especially preferred of steels having increasing chromium and molybdenum contents of the groups 6, 7 and 8 or also duplex steels (DIN names amongst others 1.4571 (1.4404), 1.4435, 1.4539, 1.4439, 1.4462, 1.4529, 1.4501). If more demanding reaction conditions are chosen, copper nickel alloys, high molybdenum containing nickel alloys as e.g. 2.4610, and titanium are to be used for example. The wall thickness of the cartridge is designed in such a manner that the cartridge can be exposed to a differential pressure of 2, preferably 4 and particularly preferred of 6 bar.

There will be a collection of solid parts by sedimentation and the effect of gravity, particularly in the base region, with the danger of caking and blockage. These prevent a smooth heat exchange and deteriorate the contact of the educts within a reaction mixture which hinders the control of the reaction. Therefore, the membrane parts used at these parts were processed specially, in particular in the base or wall region, but at least in the cone region and preferably in the lower third, particularly in the regions where deposits and caking can result. The processing of these metal sheets takes place for example by drilling holes with regular distances, preferably with distances of under 10 mm, also of under 6 mm and also under 4 mm.

The holes in the membrane parts or in the cartridge are drilled into the element or into the component by means of laser and have diameters between 200 and 10 micrometers, also between 100 and 20 micrometers, and also between 50 and 25 micrometers. The holes are preferably funnel-shaped, so that the diameter of the holes has at least double the size at the outlet compared to the inlet. By this, a fanshaped flow is achieved which enables an optimized heat transfer. The axis of the holes is almost parallel to the reactor axis and/or vertical to the surface to the perforated membrane parts. Heated or cooled and sufficiently processed process water, fresh water or water vapor is passed through the holes from the cavity to the inner space of the pressure vessel by means of an overpressure. The holes can thereby act as nozzles. The above liquids serve at the same time as a tempering means and propellant. Process water or fresh water has to be processed sufficiently to be able to be passed through the holes or the heat exchange system. The standards valid for feed water and vessel water are aimed at for the conditioning.

A cavity sealed from the inner space of the reactor is left between the reactor wall and the membrane parts which serves for the guidance of solvents, water or water vapor. The overpressure of the process water exiting from the bores is always high enough so that a penetration of reaction mixture is prevented. The strength of the membrane parts or the cartridge wall is designed in such a manner that the wall strength fulfills the demands of the pressure differences between the inner and outer side. The membrane parts or the cavities which they form with the pressure vessel wall can be divided into zones which for example comprise a concentric surface in the cone or in the base region. These are characterized by different pressure stages. The different pressure stages materialize for example through valves or separate pumping systems. Deposits and caking by gravity-induced sedimentations can thereby be counteracted. Comparable effects are achieved by adjusted diameters of the holes with consistent pressure. The diameters can for example be larger in the regions with strong sedimentations.

Alternatively to the coating or the use of additional substances for avoiding corrosion, the inner space, in particular the base or the cone of the pressure vessel and mountings and other parts in contact with the reaction mixture can be surface-treated. This is particularly achieved by a reduction of the surface roughness. Alternatively or additionally to the surface treatment, abrasive manufacturing methods are employed after the usual pretreatment, also electrochemical abrasion methods, or also anodic abrasion of metal in an electrolyte specially adjusted with regard to the material.

During the chemical conversion reaction, approximately 5 to 34 percent of the energy contained in the feed material is released as heat. This energy is used for other processes with heat requirement within or outside the process via apparatuses for the heat exchange. The heat can for example be used for preheating the biomass or the reaction spaces within the process or the plant. Outside the process or the plant, the energy can be used for heating rooms, machines or as process heat for other processes. With the aid of the tempering system, not only the necessary heat energy for initiating the chemical conversion process shall be added, but also the heat energy released with the exothermic reaction shall be discharged. The development of uncontrolled hot spots and thereby the runaway of the reactor can therewith be counteracted. At least one, and preferably more or a combination of different tempering systems are used which are driven in a mechanical, electrical or chemical manner. In addition or alternatively to the process water systems mentioned below, the tempering system of the reactor consists for example of a double wall construction, a screw-in radiator, heating and cooling coils or fins introduced into the reactor or half-tube coils welded to the outer wall. Alternatively or additionally, a heat exchanger plate system can be used depending on the construction and the chosen material. Process water and/or a thermal oil are preferably used as heat energy carrier or tempering medium for tempering systems which are flown through and closed to the inner space of the reactor.

The combination, positioning, design and control of the respective tempering system results from the process procedure and particularly depend on the composition of the feed material. All process water systems outside and within the reactor can be used for the tempering process. This can take place on the one hand by external, that is, heat exchange processes outside the reactor, and on the other hand by the introduction of tempered process water as a thinning, tempering, suction medium or propellant for mixers, pumps and/or nozzles as aspired material for the liquid jet or jet vacuum pumps. A mixing of process and fresh water can also serve for an optimized reactor tempering. The process procedure can thereby additionally be optimized, by for example decreasing the concentration of certain inorganic substances. The introduction can advantageously be a tempering medium, in particular by injecting tempered water or recycled process water at locations which are critical with regard to the temperature. The tempering is additionally controlled via the process procedure. In addition to the combination of feed material, pH-value sample preparation and catalysts, the time-delayed introduction of feed material in dependence of its conversion characteristics is an essential element of the temperature control.

During the progress of the method, the viscosity, density and magnitude and other characteristics of the feed material or the reaction mixture change. These changes can be attributed to chemical reactions and structural changes of the carbon-containing feed material, which can also be attributed to the depolymerization and later to the polymerization of the feed material. Thereby, different requirements are made of the mixing process in dependence on the process procedure. A mixing and/or flow distribution which is as even and homogeneous as possible, depends on the state of the process, the feed material, the solid concentrations and the requirements which are made of the reaction product. An agitation or suspension takes place continually or intermittently for the purpose of heat exchange, intensifying of the educt contact and or the purpose of the better disintegration of for example layers with a high content of lignin or cellulose which are still crosslinked, even distribution of the reactants and mainly of the catalyst mixture and venting of the reaction mixture. The sedimentations are dissolved at the same time, loosened, and a thrombusus and agglomerate formation is counteracted. The reaction progress is thereby influenced in an altogether positive manner. That is, the more thorough and the more even the mixing procedure, the faster the reaction procedure, and the more homogenous the reaction product. At least one or several, and in particular a combination of different mixing systems with and/or without movable parts in the reaction space can be used. One or more or a combination of different agitators can be used as mixers with moved parts in the reaction space. The agitator is equipped with at least one and preferably with two or several shafts, so that further agitators are driven via the same motor and reactor inlet. The relative low energy requirement compared to the energy supply or to the mixing time is an advantage of these agitation systems. The essential disadvantage, in addition to the high cost, is the susceptibility to failure and the higher maintenance compared to mixing systems without moved parts in the reaction space.

Jet vacuum pumps or liquid jet mixers, pumps and nozzles are among liquid jet systems. They usually do not have any moved parts and therefore require less maintenance. Liquid jet systems can serve as mixing systems, as they are suitable for introducing kinetic energy into the reactor via a propellant which can also serve as a heating or cooling means, so as to suspend and homogenize the reactor content. Further advantages of liquid jet systems are among their small size, minimal disturbance of the stream and flow relations and avoidance of sealing systems. Stream breakers, which often have to be used for conventional agitation systems, are superfluous. Therefore, no stream breaker-conditional stream dead zones are present during the use of these systems. At the same time, floating (floating of solids) is avoided, whereby the danger of air intake is reduced. The liquid jet systems can be fed from a common or several process water reservoirs. They can be controlled independently from one another and different amounts of propellant and/or tempering means can pass through. Propellants and/or tempering means are preferably added almost continually and/or in intervals for the suspension and homogenization. The positioning of the liquid jet systems and in particular of jet vacuum pumps or liquid jet mixers is chosen so that a formation of a liquid stream results for example in the form of a vertical loop stream. With reactors having a diameter-height ratio of 1:2, a loop stream can also be formed in the shape of an eight, or with corresponding heights, further loops which run transversely to the vertical. Liquid jet mixers or jet vacuum pumps are preferably positioned in the top half, especially in the upper third, whereby the propellant jet is directed downwards almost parallel to the reactor axis. Several liquid jet mixers or jet vacuum pumps are connected in series with larger or higher reactors, in particular from a diameter-height ratio of 1:3, that is, they are connected in series at different heights, so that a respective following mixer accelerates the accelerated stream. With larger diameters, in particular more than one meter, several liquid jet mixers or jet pumps are positioned on a longitudinal axis in such a manner that the propellant jet is strengthened effectively in one direction. If more than two liquid jet mixers or jet vacuum pumps are used at one height, the number of the liquid jet mixers, the accelerated stream of which is directed downwards to the reactor base, respectively the same. One or several liquid jet mixers or jet vacuum pumps are positioned just above the base region or the cone, so that the stream is directed tangentially over the wall of the base or the cone. One or several liquid jet mixers or jet vacuum pumps are positioned immediately next to the outlet nozzle in the centre of the base region or the cone, so that the stream is directed tangentially over the wall of the base or the cone.

The solids de-agglomerate by means of the turbulence and the shear load of the liquid jet systems or jet vacuum pumps.

By the additional use of comminution apparatuses in the region of maximum turbulence and shear load, in particular the intake or suction and exit openings, the formation of clumps and agglomerates is counteracted in a targetted manner. At positions, where the intake or suction openings tend to blockages, they can be supplied with their own process water supply, whereby the process water only needs to be treated coarsely for this purpose. Sieves, filters and membranes are for example used for the coarse treatment. The coarse treatment is faster and practically immediately without or with essentially low reserve volumes compared to the process water treatment of propellant and tempering means. Alternatively, intake or suction openings of the mixers in danger of blockage and deposits are kept free with their own propellant stream circuit and/or are equipped with a mechanism for the short-term flow reversal. For the control of these nozzles, flowmeters, manometers and valves serve which react to blockages for example by pressure changes in the suction region. A mixed reaction mixture supply for the suction slots or suction openings of the mixers in danger of blockage and deposits can be realized by a divided propellant stream supply: one part is sucked in directly from the reactor, another part is filtered coarsely and sucked from the upper reactor part. The propellant stream supply is controlled and switched via valves, so that propellant is saved for example when operating problems occur or the level of treated purified water reaches low levels.

Nozzles can be used at targeted locations in the inner space of the vessel. Among these are particularly dead space regions or zones in which deposits and caking is to be prevented. A continuous pressure difference is present in all liquid jet systems compared to the inner pressure of the reactor so as to prevent a backflow of the reaction mixture into the mixers, pumps and nozzles. A deceleration or standstill accelerates the deposit and sedimentation process of the solid reaction products which accumulate thereby increasingly in the lower reactor part.

During the chemical conversion processes, deposits and caking can result on the walls of the reactor and the mountings and parts which come into contact with the reaction mixture. A cleaning process can be carried out after transferring the reactor content into another pressure vessel without essentially decreasing the operating temperature. A movable and a controllable high pressure nozzle can for example be used as cleaning apparatus. The apparatus can be introduced into the inner space by a hand hole, a sluice or a valve. The cleaning procedure is carried out under direct visual control or by means of one or several cameras. The cleaning apparatus can be controlled remotely. The pressure and the temperature of the propellant are adjusted so that the best possible cleaning result is achieved without damaging the lining materials or coatings. Dry ice emitters are particularly suitable for the surface cleaning of the jet media: Dry ice pellets as jet means are accelerated to 300 m/s with pressurized air and impact the dirt layer with a high kinetic energy. They thereby cool them to minus 80° C.; the dirt layer shrinks and becomes brittle. At the same time, the dry ice pellets evaporate and suddenly extend up to 700 times which blasts the dirt layer from the surface. The elaborate reconditioning or disposal of a cleaning medium is unnecessary by the use of a dry ice jet. Environmentally harmful organic solvents and halogenated carbohydrates become superfluous. A further decisive advantage results by the dry ice pellets being dissolved in air: A division and an external cleaning of plant components often becomes superfluous. A dry ice jet is preferably used as a dive snorkel system. It is introduced into the reactor via a hand hole at a central position and is docked to a holding system which was positioned previously. The dry ice pellets are directed towards the locations to be cleaned by means of a rotating spraying device.

A liquid or gaseous medium as for example water, reconditioned or treated process water or a gas as for example water vapor can serve as propellant for the jet vacuum pump or liquid jet mixers. The process water is sieved, filtered and freed from contraries at or immediately after the exit from the reactor, so that the mixers, pumps and nozzles are not blocked and the wear of reactor tube, pump components and other mountings is minimized The temperature of the propellant is adjusted with the help of a heat exchanger, so that its introduction serves for the control of the process temperature. The propellant/tempering media is passed through outside of the reactor(s) at a similar pressure as within the reactor(s). If the tempering function of the process water is foregone, it is passed through outside the reaction spaces at similar temperatures as inside the same. As an alternative to process water, fresh water, water vapor or water from other processes can be used as propellant, heating or cooling means.

The materials present in the process water depend on the mixture of the feed material and the process procedure including the catalysts. Materials previously bound to the biomass are dissolved by the procedural disintegration. Numerous elements including chlorine, sulfur, nitrate and their salts and metals, in particular heavy metals and minerals and alkalis as for example potassium or sodium and their salts pass into the aqueous phase in a certain part during the chemical conversion process. One part is again bound in the solid phase. The remaining part remains in the liquid phase. The parts of the materials which go into the liquid phase, are also dependent on the concentration difference, that is, the concentration already present in the liquid phase. A saturation up to the precipitation of certain materials takes place with increasing concentrations. Inorganic materials and compounds, for example sulfate and chloride, can thus precipitate as salts and thereby influence the process procedure and the reactor components unfavorably. The part of organic carbon compounds in the liquid phase can be above 50 g per liter. The chemical oxygen demand (COD) value of the process water is already in the higher 5 digit region (mg $O_2$/l) without recycling and thereby significantly exceeds the legal introduction boundary values. The chemical oxygen demand (COD) is to be generally understood as the amount of oxygen that is necessary to chemically oxidize all organic contents of a defined material amount.

A process water fraction of 10 to 35 percent, also from 35 to 60 percent, or also from 60 to 85 percent is recycled in dependence on the moisture content of the feed material and the process procedure including the solid-liquid ratio. An almost complete return of the process water, that is, a circuit closure or restriction of the process water circuit is only possible in a limited manner with the aim to save fresh water and to reduce the waste water volume. For, in addition to the accumulation of organic carbon compounds, an enrichment of inorganic materials such as sulfate, nitrate, calcium, chlorine, phosphorous or their compounds results. Inorganic contraries concentrations accelerate the corrosion. Lime deposits disrupt the flow in the reactor and also damage mountings such as pumps, valves and nozzles. The requirements and cost of the design of the reactor increase thereby. Sulfates can precipitate. The duration of the accumulation or saturation depends on the material composition of the feed material and the process procedure.

The chemical conversion process usually lasts several hours. During this time, complex chemical processes connected with material changes take place which have to be considered for the optimization of the process procedure. Different types of biomass are supplied in intervals in the first two to three process phases. Depending on the desired reaction product, reaction products are for example withdrawn towards the end of the last two process phases. Propellant or tempering means as for example a gas, water, in particular process water and/or process/synthesis gas and catalysts are withdrawn or supplied during the running process. Reactants and in particular secondary products are removed, which disturb the course of the chemical reaction, the mixing and also the flow.

Different methods can be used for the deposition of the solid materials and in particular the reaction products in the reaction mixture. The solid-liquid separation serves for the separation of the liquid phase, whereby a concentration of the solids is achieved. Different sifting processes (coarse sifting, fine sifting), filtration processes and/or the deposition by centrifugal force by means of a cyclone can be combined with one another for the separation of the solids. So as to reduce the effort of a filtration or the sifting during the process, one or several filtration or sifting processes are carried out within the scope of the pretreatment.

From these two methods, at least one coarse or one fine filtration or a combination of these two methods can take place. By means of the filtration methods, in particular micro and/or ultrafiltration method or a combination of both, one third to two thirds of the total organic carbon compounds can be removed from the process water. The solid-liquid separation is preferably carried out at operating conditions, and usually goes beyond the use of simple paper filter as are for example used on a laboratory scale. The choice of the used methods depends amongst others on the chemical composition, particle size distribution, density, particle form, firmness and solubility and includes the use of electrical currents and loads, different densities and centrifugal forces and different particle sizes.

The dynamic, static, vacuum, pressure and sterile filtration, amongst them in particular the cross flow filtration including available micro-, ultra-, nanofiltration and reverse osmosis method are among the apparatuses used. Preferably apparatuses are used where the underlying method or function principle of hydrocyclones, centrifuges, electrical or magnetic separation devices and/or filtration methods is used. The preferred filtration methods are particularly among those which can be used with the reaction conditions of the hydrothermal carbonization. For the solid-liquid separation, in particular at operating conditions, rotation disk filters or centrifugal membrane filters are preferably used. The preferred material which is responsible for the formation of the pores consists of metal and in particular of ceramics. The form of the pore-forming material is preferably disk-shaped. Depending on the filtration method used and materials introduced, there is not always present a proportional ratio of pore size of the filter and the solid amount in the filtrate. This particularly applies to the use of ceramic materials for the filter elements. The aqueous phase is introduced into a process water reservoir in a filtered or unfiltered manner. The characteristics of the solids to be separated, and thereby the choice of the methods chosen for the separation depend on the process procedure and on the characteristics of the desired reaction product. The further the process has progressed and the higher the density of the reaction product, the easier it is to carry out the separation process. The separation preferably takes place near the operating conditions. The solid amount in the filtrate usually sinks proportionally to the pore size and can increase significantly by the use of an ultrafiltration method and be over two thirds to four fifth. One or several apparatuses for the solid-liquid separation are integrated into the process for the elimination of sand and other contraries with a high density or a high weight which become separable in the course of the treatment of the biomass. The use of the principle of the centrifugal force separation of solids is particularly advantageous for the cleaning of the process water which is used as propellant jet medium to protect pumps, mixers and nozzles.

Process water is withdrawn for reconditioning or treatment during the process at one or several locations from the upper half, preferably from the upper third, particularly preferred from the upper quarter of the reactor. Reconditioned or treated process water is returned to the water circuit of the plant for recycling. At least one and preferably several process water reservoirs can be used for every individual reactor or for several combined reactors. Different cleaning steps precede the individual process water reservoirs. The volume of individual or a common process water reservoir is approximately 35 to 85 percent of the total volume of all reactors in its sum. The process water reservoir is designed for the temperature and pressure load of the reactors, so that pressure reduction degree and heat exchange apparatuses are not compellingly necessary. A process water cleaning is integrated into the water circuit of the described plant. Different treatment or reconditioning methods are necessary depending on the use of the reconditioned process water. Different mechanical, chemical and biological methods and apparatuses are used for this individually or in combination. Aerobic and anaerobic high performance bio reactors, bio membrane reactors, anaerobic and animate slurry methods. The above-mentioned methods and apparatuses integrated or connected into the process water circuit shall decrease the content of organic compounds in the circuit water considerably, but the measure of the return of the process water has to be made dependent on the concentrations of organic substances which are not sufficiently disintegrated and high alkali metal or mineral material concentrations as for example calcium. So as to be able to return a part of the process water as high as possible, a particularly effective combination of different methods and apparatuses is to be used.

The apparatus for the mechanical waste water cleaning is a filter, preferably a microfilter and especially an ultrafilter, and can be congruent with the methods for the solid-liquid separation described above. The apparatus for the solid-liquid separation, into which the filter(s) are built, is preferably a rotation disk filter and especially a centrifugal membrane filter. For the biological cleaning of the process or waste water, an apparatus is used which soonest satisfies the complex requirements for cleaning or treatment. For example, an apparatus in the steel construction manner is to be used preferably, for example a high performance bioreactor in the biomembrane method, preferably an aerobic process water treatment, especially a loop reactor. The loop reactor should have an effective nozzle for mixing the solid and liquid phases in its design. Alternatively or additionally to the aerobic method, a reactor for the anaerobic process water treatment or also reverse electrodialysis (electrodialysis reversal) can be used, particularly for the nitrate recovery, distillation, vaporization and/or ion exchange methods and active coal.

The odor exposure makes requirements regarding the storage and the transport of the solid, and the design of the plant, building and conveying plant. The intensity of the odor exposure decreases with the duration of the storage time. The building or the storage and transport spaces, in particular for the fuels, are to be designed air or odor tight, so that the loaded air cannot escape. Accesses to the building are sealed by sluices. One or several chemical and/or biological air cleaning plants are installed, so the odor exposure will be reduced to a minimum for employees, suppliers and residents.

The cooling of the reaction product, in particular below the boiling temperature at one bar absolute pressure usually takes place outside the reaction space, also in an apparatus for relaxation. The heat energy released thereby can be made available for other processes via heat exchanger processes.

One or several comminution steps take place before, during or after this process. For this mills or pressing methods are preferably used.

The separation of the solid phase from the reaction mixture usually takes place in the first step in mechanical and in the second step in thermal separation devices.

A static thickener is used for reducing the water content under the action of gravity with or without mechanical rotating apparatus or a raking machine, for example a stationary thickener or a throughput thickener. The control of the supply amount can be made by a dosing device. The device enables to dispense the thickened mixture evenly dosed and to several machines with a correspondingly high volume. The thickener can also be integrated directly into the drying apparatus. An advantageous design of the cone construction makes it possible that the drying apparatus is charged directly with the mixture. External installations can be foregone with a corresponding adjustment of the process magnitudes. The mixture to be thickened can alternatively be introduced under pressure to an arched sieve surface or a curved screen. The resulting centrifugal force presses a part of the liquid through the sieve slots. The thickened mixture is combined at the end of the sift course and fed to the drying appliance. A hydrocyclone offers a further advantageous separation method, in which solid and liquid are separated by centrifugal acceleration. The thickened mixture in the underflow is supplied to the drying apparatus and the processed or clarified liquid leaves the hydrocyclone in the overflow. A continuous and an optimized supply to the drying apparatus can be ensured by preceding and adjusted thickening devices and interposed dosing apparatuses. This is particularly important with the use of a shear centrifuge for drying. Shear centrifuges have a high operational safety and are suitable for dehumidifying and washing of granular solids.

Thermal drying methods are preferably used for drying in addition to mechanical apparatus which often has to be connected ahead of the drying for energetic reasons. The amounts supplied to the drying procedure have a weight above one kilogram. A continuous operation is preferred to a charge operation. The drying process takes place by means of at least one or several driers or by a combination of different apparatuses for separation and/or drying. A convection drier is for example used for drying the reaction and secondary products. The goods to be dried thereby come into contact with hot drying gas. It is hereby disadvantageous that the used gas has to be discharged and usually has to be cleaned with dust separators. The gas is possibly returned to the moisture after condensing. A fluidized bed drier can for example be used as convection drier. Spray, nozzle tower or flow driers can be used depending on the present or desired particle size. A continuous process is advantageous, where one or more tray, drum or tunnel drier are used.

When a contact drier is used, essentially only the contact surface is available for the heat transfer. A belt, vacuum belt, drum, screw, cylinder, roller or belt drier and preferably a vacuum drum filter or drier is used. For achieving lower moisture contents, a disk drier can alternatively or additionally be used, depending on the throughput. The drying process can take place by means of a hot gaseous medium as for example air at temperatures between 61 and 95 degrees centigrade, preferably between 65 and 90 degrees centigrade and further preferred between 70 and 85 degrees centigrade. Alternatively, overheated water vapor and particularly preferred water vapor having a temperature of 130 to 180 degrees centigrade is used above all in the thermal drying apparatuses.

A combined mechanical-thermal method can be used for the separation or for drying. The advantage of a mechanical-thermal process compared to the conventional methods is a significantly lower residual moisture of the product, whereby an improved conveyability or transportability of the product is achieved, especially with fine particle or nanosystems. It is a further advantage that a partial washout of contaminations from the reaction product takes place by means of the condensating steam. The use of steam as a further driving dehumidification potential results in an increase of the performance for centrifuges working in a filtrating manner. The mechanism of the even mechanical displacement by a condensation front cooperates with the mass force and practically leads to a complete depletion of the coarse capillary system. Steam pressure filtration is for example among the methods using this mechanism. It uses saturated or overheated steam for a gas difference pressure removal instead of pressurized air. A steam pressure superposed centrifugal dehumidification is used especially preferred. In a method space, the process of the combined steam pressure and centrifugal dehumidification transfers the fine disperse solid of the reaction product from the suspension into a dry, pure, free flowing end product according to the application.

The residual moisture content of the reaction products according to the application is advantageously about 6 to 25 percent, also 10 to 20 percent or also 12 to 15 percent.

The reaction mixture is present as a suspension after the conversion reaction. Among others, the following reaction, intermediate, secondary and/or end products result in dependence on the feed material:

Fuels ranging from peat-like, over lignite-like to black coal-like fuels, humus, Maillard- or Maillard-like reaction products, carbon-containing materials such as insulating materials, nano sponges, pellets, fibers, cables, active or sorption coal, charcoal substitute material, highly compacted carbon products and materials and in particular also feed material for graphite and graphite-containing or -like products and carbon fibers and feed material for composite or fiber composite materials.

Pure, purest and ultra pure coal-like materials belong to the products according to the application. They have advantageous characteristics, which can mainly be ascribed to the reduction of mineral materials compared to the feed material. Pure coal is mainly to be understood the combustible part of the coal and purest coal is also to be understood as active coal or charcoal. The mineral content of ultra pure coal is for example under 0.1 percent by weight.

FIG. 1 shows an apparatus 1 with a reactor 2. The reactor 2 consists of a cylindrical basic body 3 including a reaction space. The reaction space 4 serves for the reception of a solid-liquid mixture, for example biomass. The reactor 2 comprises a filler 5 for the solid-liquid mixture and an outlet branch 6, from which intermediate, secondary or end products can be removed from the reaction space 4. The reactor further comprises a device for mixing the solid-liquid mixture. The device is a stirring apparatus 7 in the embodiment shown here, with which the solid-liquid mixture can be mixed during the treatment and/or processing. The reactor 2 further comprises a cylindrical guide or insert tube 8 which guides or controls the flow of the solid-liquid mixture in the reaction space 4. The reactor 2 additionally comprises a non-mechanical mixing apparatus in the form of a jet vacuum pump or liquid jet mixer 9. The reactor 2 is further equipped with a filter apparatus with which solid components are retained in the reaction space 4. Via the filter apparatus 10 and the line 11, process or industrial water can be withdrawn from the reaction space 4 and fed to a reservoir 12. The industrial water can either be supplied to the jet vacuum pump or the liquid jet mixer 9 and thereby the solid-liquid mixture in the reaction space 4 via the line 13, or can be introduced as clean water into a further reservoir 15 via a fine filter 14. From the further reservoir 15, the clean or treated water can either be returned to reactor 2 via the line 16 or supplied to the waste water via line 17.

Figure 2:
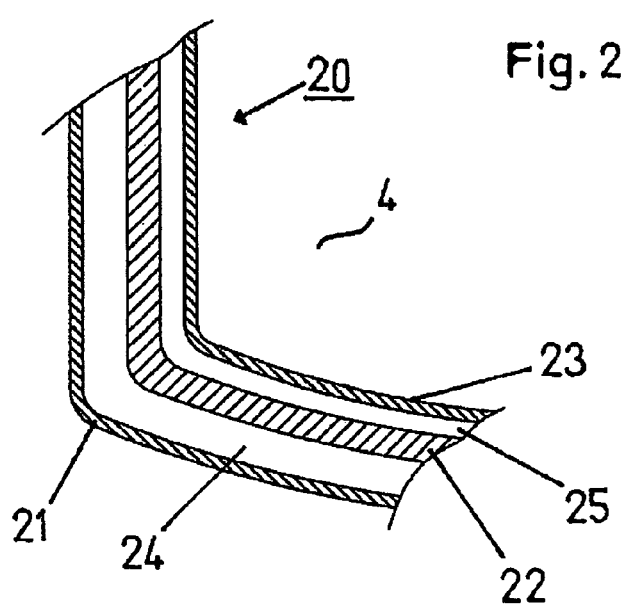
FIG. 2 shows a section of a wall region of the reactor of the application according to FIG. 1.

FIG. 2 shows a section of the wall region of the reactor 2 according to FIG. 1. The reactor wall 20 is formed in a double-walled manner, whereby the reactor wall 20 consists of an outer wall layer 21 and an inner wall layer 22. The inner wall layer 22 is provided with a membrane part 23 at the edge of the reaction space 4, which can for example be a perforated metal sheet or a membrane metal sheet, but also a heat exchanger plate. The membrane part 23 can either be fitted into the reactor or mounted to the inner wall layer 22, for example welded. The outer wall layer 21 and the inner wall layer 22 have a distance from one another, so that a cavity 24 is present between these two wall layers. A thermal oil can for example be present in the cavity 24, as is used for example for the transfer of heat energy in heat transfer plants. The thermal oil is heated and introduced into the cavity 24, so as to heat the inner space of the reactor. This takes place in a closed circuit. The advantage of thermal oil compared to water is thereby its significantly higher boiling point, so that a temperature of up to 300° C. can be reached. A further cavity 25 is between the membrane part 23 and the inner wall layer 22. This further cavity 25 serves for the reception of clean water and can for example also be used as a tempering system. If the membrane part 23 is a membrane metal sheet or a perforated heat exchange plate, the pressure in the cavity 25 has to be at least slightly above the pressure in the reaction space 4, so that no components of the reaction mixture can reach the cavity 25. Due to the extreme reaction conditions in the reaction space 4, the inner wall layer 22, but mainly the membrane part 23 consists of a corrosion-resistant material or are at least coated with such a material.

Figure 3:
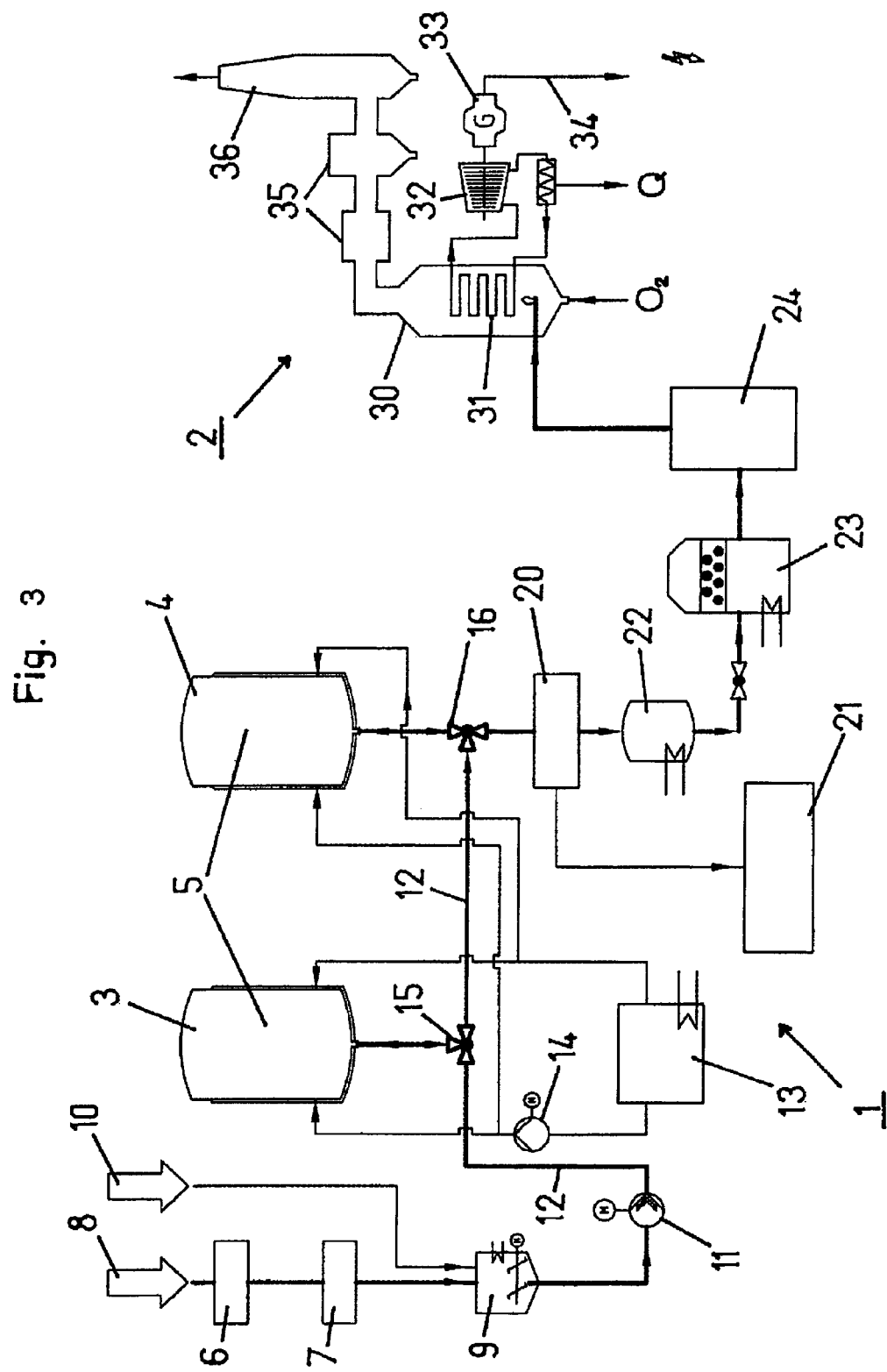

FIG. 3 shows an exemplary schematic embodiment of a plant.

The combustion of the fuels or reaction products generated in the apparatus can, in dependence on the type of the fuels, take place for example in pellet furnaces, pellet vessels or annex combustors, preferably with an automatic fuel supply.

The arrangement for the production of energy can for example comprise a combustion plant. The form and size of the combustion disk in pellet furnaces are adjusted to the ash content. As the ash content is lower with the use of the apparatus according to the invention, smaller combustion disk diameters are sufficient. For the prevention of caking at the combustion disk, the combustion plant or pellet furnace according to the application is equipped with an automatic apparatus for removing the ash from the combustion disk.

During the energy generation from dust-like fuels, the plant according to the application for the combustion of dust comprises a coal power plant or a coal dust combustion with at least one steam turbine or a supercritical coal-fired power plant. For achieving high efficiencies, the combustion process takes place at temperatures as high as possible of more than 600 degrees centigrade, or more than 650 degrees centigrade, and in a further example of the embodiment more than 700 degrees centigrade. Further efficiency increase in the high temperature region can for example be used by the use of modern power plant technologies, so that a combined gas steam turbine process with an efficiency as high as possible can be realized for current production higher than 43 percent, or higher than 46 percent, or in a further example of the embodiment 49 percent-55 percent.

The integrated gasification combined cycle (IGCC) with integrated coal gasification is suitable for combustion of fuel produced by the method of the application, but also fluidized bed combustion techniques, particularly the circulating pressurized fluidized bed combustion combined cycle (PPBC) and especially combination power plants with coal fired combined cycle power such as the pressurized pulverized coal combustion (PPCC).

The combustion process should have a flue gas entry temperature of >1,000 degrees centigrade, preferably >1,200 degrees centigrade, and particularly preferred >1,400 degrees centigrade. The flue gas cleanup at high temperature is designed in such a manner that the particle content and the content of corrosive materials, in particular sodium and potassium compounds, as well as corrosive flue gases is reduced to such an extent that the flue gas can immediately be fed to a gas turbine, using the low temperature plasma characteristics of the flue gas.

A particle content <3 $mg/m^3$ i.n. with d<3 micrometers, alkali content V0.01 $mg/m^3$ i.n. can be realized by the provision of a separator for liquid slag contained in the flue gas within the plant according to the application.

A further way for the production of current or energy from dust-like fuels is the use of a carbon fuel cell. A carbon fuel cell has two distinct advantages compared to the hydrogen fuel cell: On the one hand, the charging state of carbon is twice the size than that of a hydrogen molecule. The gas volumes before and after the reaction have the same size in the case of the carbon fuel cell, but different in the case of the hydrogen fuel cell. This means that the entropy in the first case almost does not change, thus, the entire heating value can be entirely converted into electrical energy. The rate of utilization of the carbon fuel cell is therefore theoretically up to 60 percent higher than with the hydrogen fuel cell. It is a challenge to achieve the necessary particle densities for the carbon. The plant according to the application offers the possibility to produce a coal-like fuel with a particle size in the nanometer region for the carbon fuel cell.

Synergies with other energy generation methods can be created by the common use of apparatuses for energy generation, in particular of turbines, such as steam, gas or wind turbines as they are for example used in wind towers. The Dispatchable Wind Power System (DWPS) is among the renewable energies where a common use of turbines and in particular of steam or gas turbines is useful. Compressed air is thereby decompressed in a plenum chamber. This compressed air is then additionally introduced into a turbine running already. The efficiency increases by the introduction of compressed air into a turbine running already by more than 20 to 200 percent, or 40 to 170 percent, and in a further example of the embodiment by 60 to 150 percent.

At least one part of the energy which is generated in the apparatus according to the application by the utilization of the fuels produced, in particular in the form of heat and/or electrical energy, can be one of the following devices:

remote and near heating network processing and treatment processes of feed material, water including process water, reaction, intermediate, secondary and/or end products, in particular of fuels, carbon-containing materials, humus and/or Maillard or Maillard-like reaction products of biomass including comminution, drying, dehydration, conditioning, cleaning and/or drying, processes for the removal of metal and contraries, in particular metallic materials, for example by means of cyclonic separators, incubators, stirring or mixing systems, pumps, heating, supply of water vapor, heat exchanger processes, compaction, transport and conveying processes, process water, water and waste water conditioning or treatment and air cleaning or treatment, solid-liquid separation processes, cooling and conditioning for further processing and energy recovery;

industrial operations for the production, processing and treatment of metals and in particular of aluminum, ferro silicon, food, in particular milk processing, beer production, horticultural operations with and without greenhouses and meat processing;

operations for the production and processing of manure and manure means, tire recycling plants;

operations and production plants of the chemical industry, in particular for the production and processing of products of air components and other materials in gaseous and liquid form including oxygen, nitrogen and argon;

water cleaning and desalinization plants, in particular using reverse osmosis; or oil mills, refineries, plants for ethanol production.

For the heat and energy exchange and for using synergy potentials, the utilization of the fuels and/or reaction products generated by the plant according to the invention can be operated together with different power plant and energy generation processes. For this, the following are particularly suitable:

Coal-fired power plants, among them the integrated gasification combined cycle (IGCC), but also fluidized bed combustion techniques, particularly the combined process with circulating pressurized fluidized bed combustion combined cycle (PFBC) and especially combination power plants with coal fired combined cycle power such as the pressurized pulverized coal combustion (PPCC).

gas power plants;

fuel cells with different fuels including methanol, coal, oil and gas;

biomass power plants; or solar power plants.

FIG. 3 shows a plant for the generation of energy with an apparatus 1 for treating the biomass and an arrangement 2 for energy generation. The apparatus 1 comprises two reactors 3, 4 connected in series, which have a cylindrical basic body each which includes a reaction space 5 and represents a type of pressure vessel. The reaction space 5 serves for the reception of the feed material including the biomass. The apparatus 1 further comprises comminution apparatuses in the form of a chopper 6 and a mill 7. The biomass is first supplied to the chopper 6 for the coarse comminution (arrow 8), and is then fed into the mill 7 for further comminution. The biomass prepared in such a manner is then mixed intensively in a mixing apparatus 9, whereby auxiliary materials as for example catalysts can also be added (arrow 10). The biomass is then supplied to the reactors 3, 4 by means of the pumping apparatus 11 via the line 12, and is further treated in their reaction spaces 5 under pressure, for example 7 bar, and at a high temperature, for example at least 160° C. The adjustment of the necessary temperature in the reaction spaces 5 is thereby ensured by the tempering system 13. The tempering system 13 can for example comprise a device for heating a fluid, which is supplied into or at the reactors 3, 4 by means of the pump 14 heat exchangers. The feeding of the biomass into the successively arranged reactors 3, 4 is controlled by the valve devices 15, 16.

After the treatment of the biomass, the reaction products are withdrawn from the reactors 3, 4 and supplied to a separation apparatus 20, which separates the solid reaction products from the liquid components. The liquid components are supplied to a waste water conditioning plant 21 and are cleaned there in an environmentally compatible manner. The still moist, solid reaction products are introduced into a drying apparatus 23 via the relaxation device 22 and are dried there to the desired residual moisture content. The dried reaction products are usually coal dust or similar fuels. The fuels are temporarily stored in a fuel store 24 arranged between the apparatus 1 and the arrangement 2.

The arrangement 2 for the energy generation comprises a combustion plant 30, which serves for the combustion of the fuels produced by means of the apparatus 1. The heat energy of the combustion is used in the combustion plant 30 to heat water or produce water vapor in the tube 31, and to drive the turbine 32 with the water vapor generated in such a manner. The rotational energy of the turbine 32 is supplied to the generator 33 and is converted into electrical energy by this, which can for example be fed to an electricity network (arrow 34). The flue gas generated during the combustion in the combustion plant 30 is treated in a cleaning method 35, which comprises for example a flue gas desulphurization and a flue gas $NO_x$ removal device, before it is discharged into the open air via a chimney 36.

Organic and also inorganic materials are also removed from the feed material during the course of the method or the chemical conversion process and are thus made available and more easily accessible. The improved accessibility is in part due to the dissolution of previously inaccessible or chemically bound materials that have partially gone into the aqueous phase. The degree to which this occurs depends on the reaction or treatment conditions. In addition to the organic dissolved and non-dissolved materials, inorganic materials such alkalis, metals, salts and acids including humic acid-like materials, calcium, magnesium, chlorine, iron, aluminum, phosphorous, potassium, sodium, nitrogen and their compounds are also among the materials which are removed or available and more easily accessible.

The solid carbonaceous components of the reaction product, which are present as materials and/or fuels after the conversion reaction, have the following characteristics amongst others:

The composition of the materials and/or fuels can be controlled by the reaction procedure. The concentration of individual materials cannot readily be varied selectively and independently of other materials offhand. However, different material groups and parameters can be changed in the same direction. For example, during a reduction of the sulfur content, the chlorine and ash content is also reduced at the same time.

In different measurements by means of elemental analysis, the carbon fraction for grass, cut hedges (thuja) and sugar beet was over 50 to 63 percent of the percentage mass fraction of the elements (dry mass) and was thereby approximately 20 to 60 percent above the mass fraction of the feed material. The oxygen fraction was reduced up to half, and the nitrogen fraction about a quarter, and the hydrogen fraction was reduced up to about a quarter.

The carbon fraction of the materials and/or fuels is increased by 10 to 300 percent, also 50 to 300 percent, or also 100 to 300 percent, in particular by 200 to 300 percent, compared to the biomass.

The carbon fraction of the materials and/or fuels is increased by 5 to 200 percent, preferably 10 to 150 percent, especially preferred 10 to 120 percent, in particular by 50 to 100 percent, compared to the biomass.

The carbon fraction of the materials and/or fuel is usually between 40 to 95 percent, also 50 to 90 percent, or also 55 to 80 percent. The carbon fraction can, in dependence on the reaction procedure and on the feed material, also achieve higher purity degrees of over 98 percent.

The hydrogen fraction of the material and/or fuel is reduced by 1 to 300 percent, also 5 to 200 percent, or also 20 to 100 percent, compared to the biomass.

The oxygen fraction of the material and/or fuel is reduced by 1 to 300 percent, also 5 to 200 percent, or also 15 to 100 percent, compared to the feed material.

The nitrogen fraction of the material and/or fuel is reduced by 1 to 300 percent, also 5 to 200 percent, or also 15 to 100 percent, compared to the feed material.

The sulfur fraction of the material and/or fuel can be a fraction of that of the biomass and is reduced by 1 to 300 percent, also 5 to 200 percent, or by 200 to 600 percent, or also 400 to over 1800 percent, compared to the feed material.

The ash fraction of the material and/or fuel can be a fraction of the biomass and is reduced by 1 to 100 percent, also 101 to 1000 percent, or also 1000 to over 3000 percent, compared to the feed material.

The particulate matter of the material and/or fuel can be a fraction of the biomass and is reduced by 1 to 200 percent, also 201 to 1500 percent, or also 1501 to 2000 percent, compared to the feed material.

A reduction of the mineral parts and of the ash and particulate fine dust part during the combustion to a multiple of for example considerably above 300 percent can be enabled by a high fraction of process water. A thinning of the mentioned fractions of substances, but also of numerous other materials occurs by the increase of the proportion of process water, which were originally contained in the feed material and which are removed during the conversion reaction and are dissolved. It could be said that these materials are washed out, so that the fraction of the soluble materials can practically be reduced proportional to the supplied process water in the solid phase.

Even when a catalyst component is left out or sub-optimal reaction conditions prevail, a higher carbon fraction can still be achieved, which is more than 5 to 10 percent over the one of the feed material. A carbon fraction of 55 to 77 percent can be obtained with an appropriate treatment of the biomass and the process procedure. With an appropriate process procedure, favorable feed material, including adjustment of the catalyst mixture, carbon values of 78 percent and more can also be achieved. These values can thereby be compared to that of fossil fuels.

After the end of the conversion reaction, the carbon fraction of the material or and/or fuel has indeed increased, but the energy content or the fuel value can have decreased up to 36 percent. For heat is released during the reaction, as it is an exothermal reaction. In the reverse, altogether at least 65 percent of the original fuel value of the dry biomass is kept.

If carbohydrate-containing biomass such as grain, sweet corn or sugar is used as feed material, the fuel value of the material and/or of the fuel is about 65 to 85 percent, or, in another example of the embodiment, 70 to 80 percent, compared to the feed material. The less carbohydrate is contained in the feed material, the lower is the energy release during the conversion reaction. This involves a higher fuel value of the reaction product at the same time, compared to the feed material.

The energy contents of the reaction product depending on the biomass used can be described as follows in an exemplary manner:

If lignocellulosic biomass such as cut greens or harvest waste is used as feed material, the fuel value of the material and/or of the fuel is about 70 to 90 percent, and also 75 to 85 percent, compared to the feed material.

If biomass with a low carbohydrate, cellulose or lignin fraction as for example clearing or sewage sludge is used as feed material, the fuel value of the material and/or of the fuel is about 80 to 95 percent, and also 85 to 90 percent, compared to the feed material.

Pure, purest or ultra pure coal can be used in a versatile manner, for example as chemical basic and feed material for further processing in the chemical industry or as fuel for a carbon fuel cell.

Numerous materials were dissolved from the solid phase during the reaction procedure and have gone into the aqueous phase and are now present in the process water. Several minerals such as phosphorous, sulfur, but also nitrate can be recovered from the process water. These can then be used as fertilizer, raw materials or materials for other processes. In order to ensure a natural cycle it is of interest that mineral components can be isolated particularly from the liquid phase so that these can again be returned to surfaces for the natural development of biomass. An approximately closed cycle can thereby be maintained, by returning nutrients which were contained in this biomass to the surfaces from which biomass was previously extracted for the production process.

Completely new chemical carbon compounds and structures form by depolymerization and new polymerization processes. In particular, agglomerates form which can be comminuted with a lower energy input than most known solid fossil fuels. Further, a brownish or blackish coloration results in dependence on the feed material, probably by formation of Maillard reaction products.

The density of many feed materials lower than water prior to the start of the reaction. The density continually increases during the reaction procedure and reaches a density comparable to black coal in dependence on the feed material and the reaction procedure. While the density of most feed material is at 200 to 600 kg/m$^3$, and occasionally to 800 kg/m$^3$ (dry weight), the density of the reaction product can reach above 900 to 1200 kg/m$^3$, occasionally also values of 1250 to 1350 kg/m$^3$, under the assumption that the air between the particles of the reaction products is eliminated or pressed out.

By virtue of the small particle size of the reaction product, a larger surface results compared to the feed material. This makes the drying with the same moisture content easier than with naturally occurring carbon compounds with a comparable carbon content. The large surface contributes at the same time to a lower ignition temperature.

The differential characteristics of the reaction products are the presence of Maillard or Maillard-like reaction products and the liquid and solid phase. The strong and intensive odor formation varies with the feed material. The odor formation is basically connected to the formation of Maillard reaction products.

Improved electrical conductivity compared to other naturally occurring carbon compounds with a comparable carbon content.

Turf- to black coal-like fuel.

Less volatile components than conventional or fossil fuels with the same carbon fraction.

Lower ash formation by combustion, lower content of nitrogen, sulfur, nitrate, heavy metals and reactive, that is, lower self-ignition temperatures than with comparable fossil fuels with a similarly high carbon fraction.

Advantageous and less damaging composition of the flue gases by combustion than comparable fossil fuel having a similarly high carbon fraction.

Altogether, numerous advantages result from the above-mentioned characteristics of the new reaction product and its environmentally and climate friendly characteristics compared to conventional fuels. The treatment method is more efficient and economical for the purpose of an industrial production of materials and/or fuels from biomass compared to the conventional methods for energy recovery from biomass. With the material conversion of the biomass, practically no carbon has to be lost. Usually more than 95 percent of the carbon contained in the feed material passes into the solid components of the reaction product, which can be used for energy recovery. The remainder of the carbon compounds goes into the liquid phase. During the conversion reaction in the reactor, practically hardly any noteworthy amounts of carbon dioxide or other greenhouse gases are released.

About 1-4 percent of the carbon of the feed material can go into the liquid phase. The fraction thereby depends on the process procedure, in particular on the carbon content of the feed material and on the liquid-solid ratio of the reaction mixture.

Carbon-containing nanomaterials and structures are formed by the reaction procedure, in particular by the choice and composition of the feed material and catalysts. These materials partially have useful material and surface characteristics. Among these are for example nano-sponges which can be used as water reservoirs or insulating materials.

The so-called Maillard reaction during with heating processes such as baking, frying, roasting, grilling and deep-frying of proteins or albuminous and carbohydrate-rich food at temperatures over 130° C. During the course of the so-called Maillard reaction, red to yellow-brown, sometimes black-colored polymers, the melanoidines, result from carbohydrates and amino acids in addition to a plurality of flavoring agents. Particularly many and dark melanoidines are formed by high temperatures as they occur during baking and roasting, but the reaction is also accelerated by higher pressures. They thereby form a substantial part of the food in products such as bread, coffee, malt, nuts or cornflakes and makes for example up to 30 percent of coffee.

The feed educts of the Maillard reaction form a Schiff base in a first non-enzymatic reaction. This step takes place within minutes up to hours and is reversible, as the Schiff base is a very instable compound. The amount of the Schiff base depends directly on the glucose concentration, as the product decays within minutes, when glucose is removed from the reaction or the concentration is lowered. The instable Schiff base further transfers to the more stable Amadori product. This process is considerably slower, but, as it is less reversible, the Amadori products accumulate. The primary Amadori products rearrange themselves and further react to the end products of the Maillard reaction, the advanced glycation end products (AGE). The AGEs can form crosslinks with other proteins through rearrangement and polymerization. Due to the development path, there are very many different and complex forms of AGEs, whereby $N_\epsilon$-(carboxymethyl) lysine (CML), furosine and pentosidine have been examined most intensely up to now.

Maillard or Maillard-like reaction products are formed in high concentrations during the hydrothermal carbonization. In the solid (amongst others solid) and in the liquid phase (e.g. process water), there are relatively high concentrations of the indicator substance CML, which are usually between 0.3-2 mmol/mol lysine. Higher concentrations are usually present in the liquid phase, that is, in the process water, than in the solid phase of the reaction product. The concentrations or concentration ratios depend on the solid-liquid ratio and on the composition of the feed material and the process procedure. Antioxidant and chemo-preventive characteristics are assigned to CML. It is therefore to be assumed that comparable or similar characteristics can also be found with other intermediate, secondary or reaction products of the hydrothermal carbonization, including the Maillard or Maillard-like reaction products.

Insulation and cleaning of the Maillard or Maillard-like reaction products take place amongst others by means of filtration, ultrafiltration and/or chromatographic methods, in particular by means column chromatography.

The humus which is produced in the method according to the invention by means of hydrothermal carbonization, results by a comparably shorter dwelling time compared to reaction products having a higher fuel value. It usually still comprises fiber-containing material (amongst others lignin and cellulose) of the feed material. The biopolymers are not completely depolymerized. The humus produced according to the application has a carbon fraction of at least 30 to 45 percent and a heating value of at least 15 to 24 MJ/kg, and can be burnt well.

The humus produced according to the method of the application can partially have similar characteristics as natural humus and partially also turf or peat:

It protects the ground from erosion by rain, as the water can percolate evenly and deeply, reduces the erosion by wind, feeds rain worms and other useful ground organisms, reduces the ground temperature in the summer and increases it in the winter, supplies the plants with nutrients, whereby it releases them so slowly that the plants can deal with them, enables the ground to store the water in a sponge-like manner and limits the evaporation to a minimum, controls the chemical changing processes in the ground by adding lime and organic manure, releases organic acids, with which a highly alkaline ground is neutralized, to release minerals, and stores ammonia and other nitrogen compounds in a changeable and usable form.

Several positive characteristics are present unlike humus or turf, which has formed naturally over a long periods of time:

The water binding capacity can be increased considerably by the process procedure and exceeds that of natural humus or turf significantly. It can also be a multiple thereof.

The above characteristics for the reaction products of the method of the application are valid for the combustion characteristics.

Certain materials can be enriched in the humus by an optimized process procedure, in particular by the concentration difference between the solid and liquid phase within the reaction mixture. This is desired during the utilization of the humus as $CO_2$/carbon sink or fertlizer. Unlike this, during the processing of admixture of humus produced according to the application to products, where an enrichment of certain materials is not desired. In addition, an enrichment of mineral materials and alkalis and other substances, which are detrimental for the product utilization, is avoided. The humus produced according to the application is a uniform humus and fuel, the characteristics of which can be calculated and controlled via the composition of the feed material and the catalysts, as well as the process procedure. Humus produced according to the application can be produced within hours. The method according to the application is thereby considerably faster than other known production methods of humus, which usually take weeks or months.

The materials and/or fuels produced according to the method of the application including turf or peat or turf-like or peat-like materials have the following characteristics:

By the use of the method according to the application, turf- to black coal-like fuel results from biomass.

The fuel value depends on the process procedure, in particular the reaction duration. The fuel value increases with the reaction duration or the dwelling time in the reactor.

Less volatile components than conventional or fossil fuels with the same carbon fraction.

The energy yield up to coal is 0.7-0.95. The lower the carbohydrate content, the higher the energy yield.

90-95%: lignins or bacterial biomass.

The fuels are more reactive and have lower self-ignition temperatures than comparable fossil fuel with a comparable carbon fraction of the total amount.

Fossil fuels such as lignite or black coal have indeed similar heating values compared to fuels which are produced by means of the method according to the application, but they are distinctly different to fuels with regard to the composition and characteristics.

The different types and species of fossil coal have very different chemical compositions and characteristics, depending on the point of origin and mining area, so that every type of coal has unique and unmistakable characteristic features. The heating value of fossil Lausitz raw brown coal is for example 8.700 kJ/kg, the water content about 56 percent, sulfur content about 0.7 percent, and the ash content about 4.5 percent. The water, sulfur, and ash content of the fuel or material according to the application are all lower, while the fuel value usually is clearly above 20.000 kJ/kg. One kilowatt of fossil Lausitz raw lignite can be generated independently of the water content. In contrast, more than double the amount of current can be generated from the same amount of fuel according to the application.

In the material and/or fuel according to the application are strong verifiable concentrations of Maillard reaction products compared to fossil coal. Nϵ-(carboxymethyl) lysine (CML) has established itself as indicator. This compound is detectable in the liquid and also in the solid phase of the reaction products. Concentrations of 0.2 to over 1.5 mmol/mol lysine were measured, whereby higher parts were measured in the liquid phase than in the solid phase. The distribution of the concentrations depends on the feed material, the reaction conditions, and the process procedure.

After mining, fossil coal is present in clumps or, depending on the mining depth, in relatively highly compressed agglomerates, which have to be comminuted with a high energy effort. Further, it has to be dried and milled to a fine lignite or coal dust in coal mills. Compared to this, materials and/or fuels after the end of the process are present as small particles with a size of usually less than 1 millimeter to less than 30 nanometer and can be dried more easily due to their large surface. With this, the energy effort for conditioning and in particular drying of fuels is considerably lower compared to solid fossil coal.

The combustion characteristics of the fuel are in particular more advantageous, not only compared to fossil types of coal, but also compared to most of the currently available fuels of renewable raw materials. At least one, but often several or all of the following parameters are more favorable with fuels, in particular compared to the feed material or alternative fossil or biomass fuels: reduced ash parts, less chlorine, nitrate, sulfur, heavy metals and lower emissions of dust, fine dust and gaseous toxic substances including nitrogen and sulfur oxides. This is also valid for the compacted forms of fuels such as briquettes and pellets.

The quality of the fuel and the combustion characteristics depends on the feed material or the mixture of the feed material, on the process procedure, on the catalyst mixture and on the composition of the process water Feed material with high parts of fat and energy content lead to fuels with higher heating values. For example, during the processing of particularly suitable sludges, heating values of up to 34-36 MJ/kg can be achieved.

The ash content after the combustion of the fuel with a fuel value of 30-33 MJ/kg is reduced by up to 75 percent and more compared to the feed material with a fuel value of 17-20 MJ/kg.

The sulfur content following combustion of the fuel with a fuel value of 30-33 MJ/kg is reduced by up to 50 percent and more compared to the feed material with a fuel value of 17-20 MJ/kg.

The fine particulate matter and gas emissions are lower compared to the feed material.

The combustion result is determined by the entirety of all parameters linked to the process procedure, conditioning-dependent fuel quality and combustion technique.

The fuel is a fuel with relatively uniform properties, the characteristics of which can be calculated and controlled via the composition of the feed material and the catalysts, as well as the process procedure In addition to the differences in the combustion characteristics already mentioned, these are additional differential characteristics to fossil fuels such as black coal, lignite or peat.

Pure, purest and ultra pure-like materials also belong to the products according to the application. They have advantageous characteristics, which can mainly be ascribed to the reduction of mineral materials compared to the feed material. Pure coal is mainly to be understood as the combustible fraction of the coal, and purest coal is also to be understood as active coal. The mineral content of ultra pure coal is for example under 0.1 weight percent.

The production of briquettes from particles and dust from reaction products of the method according to the application (briquettes, dust):

- In addition to the high resistance and density of briquettes, a fast ignition and a good combustion behavior are the most important criteria for briquettes.
- By a strong cross profiling with a depth of about one to two centimeters with inclination angles between 30 to 70 degrees, the ignition behavior improves by an improved air flow in the combustion chamber and offers a larger specific surface, which leads to better combustion of the briquette.
- An optimal mixing ratio of milling dust to cellulose or lignin-containing components generated according to the application supports the stability and combustion behavior.
- The ratio of dust or fuel particles with heating values of 25-30 MJ/kg to chipped wood or wood chips is at 53:47, also at 58:42, or also preferably at 64:36. The water content of the chipped wood or wood chips can thereby be around 10 percent. The particles can thereby not be larger than 2 mm, also smaller than 1.5 mm, and also smaller than 1 mm
- The ratio of dust or fuel particles with heating values of 22-25 MJ/kg to straw is at 61:39, also at 66:44, or also at 72:28. The water content of the chipped wood or wood chips can thereby be around 10 percent. The particles can thereby not be larger than 2 mm, also smaller than 1.5 mm or also preferably smaller than 1 mm.

Corresponding to the above ratios, dust with turf or peat containing equivalent amounts of cellulose and lignin are processed to briquettes.

- Turf or peat can also be processed alone into briquettes with an equivalent cellulose and lignin content.
- The dust and cellulose- and lignin-containing additional material or turf or peat produced by the method of the application are mixed intensively together or alone, for example in an impact tab mill with a 2 mm Conidur discharge sieve.
- The forming pressure is above 100 MPa, also above 120 MPa and also above 140 MPa.
- The pressing operation takes place at a temperature of approximately 80 degrees centigrade and should not exceed 90 degrees centigrade.
- The size is about 250×60×50 mm
- The bulk density of the briquettes is about 0.95-1.15 g/m$^3$.

Production of pellets from reaction products of the method (pellets) according to the invention:

- For the production of pellets by means of the method (pellets) according to the application, the method of the wet pelleting with subsequent agglomerate drying is preferred. This method is suitable to produce pellets from fuels having different heating values with relatively low energy effort.
- Good combustion results in standard automatic combustion systems can be achieved with pellets.
- The defined emission standards for small combustion sites are thereby fulfilled.
- The prerequisite is the presentation of the fuel in a small form which is as even as possible.
- The pellets have a diameter of 3-7 mm, and preferably from 4-6 mm. The length is between 5 and 45 cm. They have a high resistance or firmness, produce little dust during handling, have a high water resistance and can be dosed well.
- The pellets are continually supplied to the fully automated pellet ovens or vessels and are combusted there in a controlled manner.
- A high thermal efficiency with minimal contaminant or flue gas emissions can be achieved by an even combustion which is as complete as possible.
- At heating values above 25 MJ/kg and also above 27 MJ/kg, bonding materials and combustion accelerators are used, in particular wallpaper paste, grassland, straw and other lignocellulosic biomass.
- The ratio of dust with heating values of 25-30 MJ/kg to chipped wood or wood chips or lignocellulosic biomass is at 81:19, also at 85:15 and also preferably at 89:11.
- Also, the ratio of dust with heating values of 22-25 MJ/kg to chipped wood or wood chips or lignocellulosic biomass is at 87:13, also at 90:10, and also at 93:7.
- A part of about up to 30 percent of the lignocellulosic biomass can for example be replaced by wallpaper paste.
- The water content of the chipped wood or wood chips or other lignocellulosic biomass can thereby be about 12-14 percent.
- The particles can thereby not be larger than 2 mm, also smaller than 1.5 mm and also smaller than 1 mm
- Corresponding to the above ratios, dust or fuel particles with turf with equivalent cellulose and lignin content will be processed to pellets.
- Turf or humus according to the method of the application can also be processed alone into pellets with an equivalent cellulose and lignin content.
- The dust and cellulose- and lignin-containing additional material or turf or peat are mixed intensively together or alone, for example in an impact tab mill with a 2 mm Conidur discharge sieve.
- The pressing pressure is above 100 MPa, also above 120 MPa and also above 140 MPa.
- The press temperature is approximately 80 degrees centigrade and should not exceed 90 degrees centigrade.
- The most important adjustments to the pellets, in particular compared to pellets of fossil fuels, result from the improved combustion characteristics and are in the region of the sinter behavior of the coal ash, the ash disposal method (usually lower ash content) and the size of the combustion disk.

Energy can be produced in a particularly advantageous embodiment of the application by using the fuels produced by means of the method according to the application. The combustion of the fuels produced according to the application takes place depending on the conditioning in different apparatuses.

- In pellet form, the fuel is usually combusted in pellet ovens, pellet vessels or extension combustors, also with automatic fuel supply. Commercially available combustion plants can usually be used. For improving the combustion characteristics, combustion plants according to the application can be adjusted to the changed combustion characteristics in the following regions:
  - Adjustment of the form and size of the combustion disk according to the ash content. With lesser ash content, smaller combustion disk diameters can be used which lead to a better combustion.

An automatic apparatus for removing the ash from the combustion disk is advised for preventing the caking of the combustion disk. The caking is usually smaller than with fuel pellets of naturally occurring types of coal, in particular lignite.

The combustion of the dust or fuel according to the application takes place in a coal-fired power plant with at least one steam turbine. For achieving high efficiencies, the combustion process takes place at temperatures above 600 degrees centigrade, preferably above 650 degrees centigrade, and especially above 700 degrees centigrade.

Further efficiency increases in the high temperature region can for example be achieved by the use of modem power plant technologies, so that a combined gas steam turbine process with efficiency grades as high as possible can be realized. The efficiency of current production can be higher than 43 percent, also higher than 46 percent, or also 49 percent to 55 percent.

The integrated gasification combined cycle (IGCC) with integrated coal gasification is suitable for combustion of fuel produced by the method of the application, but also fluidized bed combustion techniques, particularly the combined process with circulating pressurized fluidized bed combustion combined cycle (PFBC) and especially combination power plants with coal fired combined cycle power such as the pressurized pulverized coal combustion (PPCC).

The combustion process comprises a gas entry temperature of >1.000 degrees centigrade, also >1.200 degrees centigrade, and also >1.400 degrees centigrade.

The high temperature gas cleaning is designed in such a manner that the particle content and the content of corrosively acting materials, in particular sodium and potassium compounds, as well as corrosive gases is reduced to such an extent that the flue gas can immediately be fed to a gas turbine, preferably using the low temperature plasma characteristics of the flue gas.

A particle content of <3 mg/m$^3$ i.n. at d<3 micrometers, alkali content V0.01 mg/m$^3$ i.n. is realized by a separator for liquid slag contained in the flue gas.

A further way for the production of current or energy from fuels, according to the method of the application, in particular of dust, is the use of a carbon fuel cell.

Synergies can be produced with other energy carriers and/or other energy generation methods by the common use of apparatuses for energy generation, in particular of turbines, preferably a steam or gas turbine for energy generation.

The Dispatchable Wind Power System (DWPS) is among the renewable energies where a common use of turbines and in particular of steam or gas turbines is useful. Compressed air is thereby decompressed in a plenum chamber. This compressed air is then introduced additionally into a turbine which is already in operation.

If compressed air is introduced into a running turbine, the efficiency increases by more than 20 to 200 percent, also by 40 to 170 percent, and also by 60 to 150 percent.

I claim:

1. A method of producing a fuel from solid-liquid mixture of water and feed material with a carbon containing component, comprising treating said solid-liquid mixture at a temperature of between 160-300° C. at a pressure of at least 5 bars, characterized in that the solid-liquid mixture is treated for a treatment period of at least 2 hours in a reactor, wherein water formed by the chemical reaction is withdrawn from the reactor during said treatment in the reactor by means of a solid-fluid separation filtration process to increase a carbon fraction of the solid fuel produced.

2. The method according to claim 1, wherein said treatment duration is 3 to 60 hours.

3. The method according to claim 1, wherein said solid-liquid mixture is treated at a pressure of at least 7 bars.

4. The method according to claim 1, wherein said solid-liquid mixture is pre-heated prior to said treatment.

5. The method according to claim 1, wherein said solid-liquid mixture is pre-incubated in an acidic medium prior to said treatment.

6. The method according to claim 1, wherein said solid-liquid mixture is pre-comminuted prior to said treatment.

7. The method according to claim 1, wherein said solid-liquid mixture is treated with a metallic or metal oxide catalyst.

8. The method according to claim 1, wherein said water is withdrawn by a filtration apparatus containing a filter with pores made up of a metal or ceramic materials.

9. The method according to claim 1, wherein treating said solid-liquid mixture increases the carbon fraction by greater than or equal to (≥) 5% compared to the feed material.

* * * * *